(12) United States Patent
Masaki et al.

(10) Patent No.: US 7,345,972 B2
(45) Date of Patent: *Mar. 18, 2008

(54) ROTATION CONTROL METHOD AND STORAGE APPARATUS

(75) Inventors: Takashi Masaki, Kawasaki (JP); Toru Ikeda, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 20 days.

This patent is subject to a terminal disclaimer.

(21) Appl. No.: 11/175,096

(22) Filed: Jul. 5, 2005

(65) Prior Publication Data

US 2005/0243675 A1    Nov. 3, 2005

(30) Foreign Application Priority Data

Sep. 29, 2000   (JP) .............................. 2000-301462

(51) Int. Cl.
    *G11B 7/125* (2006.01)

(52) U.S. Cl. .............................. 369/47.52; 369/47.38; 369/53.43

(58) Field of Classification Search ............. 369/53.28, 369/53.35, 53.14, 47.39, 47.52, 47.38, 53.43
    See application file for complete search history.

(56) References Cited

U.S. PATENT DOCUMENTS

| | | | |
|---|---|---|---|
| 4,809,253 A | 2/1989 | Baas et al. ................ | 369/44.32 |
| 5,067,128 A | 11/1991 | Nakane | |
| 5,475,666 A | 12/1995 | Ito et al. ................... | 369/47.52 |
| 5,592,448 A | 1/1997 | Suzuki et al. ............. | 369/44.28 |
| 5,592,463 A | 1/1997 | Muramatsu et al. ..... | 369/47.53 |
| 5,844,866 A | 12/1998 | Fujimoto et al. | |
| 6,134,197 A | 10/2000 | Ishibashi et al. .......... | 369/44.32 |
| 6,275,462 B1 | 8/2001 | Masaki et al. ............. | 369/116 |
| 6,377,527 B1 | 4/2002 | Hirashima ................ | 369/53.23 |
| 6,418,102 B1 | 7/2002 | Suga ........................ | 369/47.53 |
| 6,556,624 B1 | 4/2003 | Takeshita ................. | 369/47.43 |
| 7,031,242 B2 * | 4/2006 | Masaki et al. ........... | 369/53.28 |

FOREIGN PATENT DOCUMENTS

| | | |
|---|---|---|
| JP | 04-222936 | 8/1992 |
| JP | 5109101 | 4/1993 |
| JP | 05-347068 | 12/1993 |
| JP | 6044595 | 2/1994 |
| JP | 8055422 | 2/1996 |
| JP | 8069623 | 3/1996 |
| JP | 08-185666 | 7/1996 |
| JP | 2554719 | 8/1996 |

(Continued)

*Primary Examiner*—Gautam R. Patel
(74) *Attorney, Agent, or Firm*—Greer, Burns & Crain, Ltd.

(57) ABSTRACT

A storage apparatus rotates an optical recording medium at two or more kinds of rotational speeds. The rotational speed is decreased when a read or write margin becomes less than or equal to a first predetermined value or, when a frequency of generation of a servo abnormality of a tracking servo and/or a focus servo is greater than or equal to a first predetermined frequency. On the other hand, the rotational speed is increased when the read or write margin becomes greater than or equal to a second predetermined value or, when the frequency of generation of the servo abnormality of the tracking servo and/or the focus servo is less than or equal to a second predetermined frequency.

4 Claims, 20 Drawing Sheets

FOREIGN PATENT DOCUMENTS

| | | |
|---|---|---|
| JP | 9198784 | 7/1997 |
| JP | 9288827 | 11/1997 |
| JP | 9293259 | 11/1997 |
| JP | 10-83615 | 3/1998 |
| JP | 10-149614 | 6/1998 |
| JP | 10188464 | 7/1998 |
| JP | 10-269693 | 10/1998 |
| JP | 10-302384 | 11/1998 |
| JP | 10-302413 | 11/1998 |
| JP | 10308057 | 11/1998 |
| JP | 10334582 | 12/1998 |
| JP | 11016251 | 1/1999 |
| JP | 11073669 | 3/1999 |
| JP | 11-288548 | 10/1999 |
| JP | 11306696 | 11/1999 |
| JP | 2000-105965 | 4/2000 |
| JP | 2000-113580 | 4/2000 |
| JP | 2000-163863 | 6/2000 |
| JP | 2000207815 | 7/2000 |
| JP | 2000-306246 | 11/2000 |

\* cited by examiner

FIG.3

| ZONE | | ZCAV 3637rpm | 4138rpm | (Kbyte/s) 5001rpm |
|---|---|---|---|---|
| OUTER PERIPHERY | 0 | 5090 | | |
| | 1 | 4966 | | |
| | 2 | 4842 | | |
| | 3 | 4717 | | |
| | 4 | 4593 | | |
| | 5 | 4469 | 5085 | |
| | 6 | 4345 | 4944 | |
| | 7 | 4221 | 4802 | |
| | 8 | 4097 | 4661 | |
| | 9 | 3973 | 4520 | |
| | 10 | 3848 | 4379 | |
| | 11 | 3724 | 4237 | 5121 |
| | 12 | 3600 | 4096 | 4950 |
| | 13 | 3476 | 3955 | 4780 |
| | 14 | 3352 | 3814 | 4609 |
| | 15 | 3228 | 3672 | 4438 |
| | 16 | 3104 | 3531 | 4268 |
| INNER PERIPHERY | 17 | 2979 | 3390 | 4097 |

FIG. 7

|    | 3637rpm | 4138rpm | 5001rpm |
|----|---------|---------|---------|
| 0  | 80.34   | –       | –       |
| 1  | 78.38   | –       | –       |
| 2  | 76.42   | –       | –       |
| 3  | 74.46   | –       | –       |
| 4  | 72.5    | –       | –       |
| 5  | 70.55   | 80.28   | –       |
| 6  | 68.59   | 78.05   | –       |
| 7  | 66.63   | 75.82   | –       |
| 8  | 64.67   | 73.59   | –       |
| 9  | 62.71   | 71.36   | –       |
| 10 | 60.75   | 69.13   | –       |
| 11 | 58.79   | 66.9    | 80.83   |
| 12 | 56.83   | 64.67   | 78.11   |
| 13 | 54.87   | 62.44   | 75.44   |
| 14 | 52.91   | 60.21   | 72.75   |
| 15 | 50.95   | 57.98   | 70.06   |
| 16 | 48.99   | 55.75   | 67.36   |
| 17 | 47.03   | 53.52   | 64.67   |

FIG.11

| ZONE | ZCAV 3637rpm | 4138rpm | (Kbyte/s) 5001rpm |
|---|---|---|---|
| OUTER PERIPHERY 0 | 5090 | | |
| 1 | 4966 | | |
| 2 | 4842 | | |
| 3 | 4717 | | |
| 4 | 4593 | | |
| 5 | 4469 | 5085 | |
| 6 | 4345 | 4944 | |
| 7 | 4221 | 4802 | |
| 8 | 4097 | 4661 | |
| 9 | 3973 | 4520 | |
| 10 | 3848 | 4379 | |
| 11 | 3724 | 4237 | 5121 |
| 12 | 3600 | 4096 | 4950 |
| 13 | 3476 | 3955 | 4780 |
| 14 | 3352 | 3814 | 4609 |
| 15 | 3228 | 3672 | 4438 |
| 16 | 3104 | 3531 | 4268 |
| INNER PERIPHERY 17 | 2979 | 3390 | 4097 |

ROTATION CONTROL METHOD AND STORAGE APPARATUS

BACKGROUND OF THE INVENTION

This application claims the benefit of a Japanese Patent Application No. 2000-301462 filed Sep. 29, 2000, in the Japanese Patent Office, the disclosure of which is hereby incorporated by reference.

1. Field of the Invention

The present invention generally relates to rotation control methods and storage apparatuses, and more particularly to a rotation control method for controlling rotation of a recording medium such as an optical disk when recording information on and/or reproducing information from the recording medium, and to a storage apparatus which employs such a rotation control method.

Recording media such as optical disks employ a zone constant angular velocity (ZCAV) system or a zone constant linear velocity (ZCLV) system. When the ZCAV system is employed, it is possible to obtain a high random access performance with respect to the recording medium, but a recording and/or reproducing clock frequency becomes low. For example, a data transfer rate at an inner periphery of the optical disk becomes slow. On the other hand, when the ZCLV system is employed, it is possible to obtain a high data transfer rate, but the random access performance with respect to the recording medium becomes poor because the rotational speed of the recording medium such as the optical disk changes upon access thereto.

2. Description of the Related Art

Recently, due to the popular use of the Internet, there are increased opportunities for users to download data, such as music and video data, via a communication line or the like, and to record the downloaded data in recording media. In such cases, magnetic disks of a hard disk drive (HDD), and removable optical disks such as a digital versatile disk random access memory (DVD-RAM) are used as the recording media.

In the case of the video data, the size of one file is relatively large. In addition, the video data is a continuous data, and it is necessary to continuously and stably maintain the data transfer rate over a predetermined value during recording to or reproduction from the optical disk, in order not to generate an image distortion such as frame dropout.

On the other hand, in personal computers or the like, a disk management area is usually provided in a portion of the optical disk for the purposes of managing programs and files. Accordingly, it becomes necessary to access the disk management area every time an access is made to the program or file. For this reason, in a case where the size of each file is relatively small, the access to the file and the access to the disk management area are repeated, to thereby generate a random access to the optical disk.

Therefore, the required data transfer rate and the required random access performance differ depending on the state of use of the recording medium, such as the kind of data processed, the file size and the usage of the recording medium. Hence, it is conceivable to increase the rotational speed of the recording medium such as the optical disk, depending on the required data transfer rate and random access performance.

On the other hand, in optical disk units, the trend of the development is to increase the storage capacity and to increase the recording and/or reproducing speed. If the recording and/or reproducing speed is increased, the data processing speed can be increased when the user uses the recording medium, thereby enabling a more efficient recording and/or reproduction.

As a method of increasing the recording and/or reproducing speed, it is possible to increase the rotational speed of the recording medium such as the optical disk. As other methods of increasing the recording and/or reproducing speed, it is possible to increase the data recording density or to use a direct overwrite type recording medium. However, in order to enable the use of the existing recording system and recording medium as they are, it is desirable to increase the rotational speed of the recording medium, that is, to increase the rotational speed of a spindle motor which rotates the recording medium such as the optical disk, as a method of increasing the recording and/or reproducing speed.

But when the rotational speed of the optical disk is increased, it becomes necessary to increase an emission power of a laser diode which is used as a light source when carrying out a recording or erasure. In other words, the formation of a recording bit depends on an energy product of the irradiating laser light ((irradiation time)×(irradiation power)), and the linear velocity increases and the irradiation time decreases as the rotational speed increases. For this reason, in order to maintain the same energy product, it is necessary to increase the irradiation power.

On the other hand, when carrying out a reproduction, a frequency of a reproduced signal increases and a reproducing margin for decoding decreases as the rotational speed of the recording medium increases.

Therefore, if the rotational speed of the optical disk is increased to a high speed, there is a possibility that the power of the laser diode will become insufficient and/or the reproducing margin will become insufficient. Although the optical disk unit is generally designed to operate with a sufficiently large margin even when the optical disk undergoes a high-speed rotation, there is a possibility that the required read and/or write performance cannot be maintained during the high-speed rotation, due to inconsistencies among the individual optical disk units, inconsistencies in sensitivities of the individual recording media, deteriorated margins caused by temperature changes, and the like.

In addition, when the optical disk is rotated at the high rotational speed, the effects caused by warp and surface undulations of the optical disk and eccentricity of the optical disk become larger by the amount of increase in the rotational speed. In other words, an acceleration in a focus direction caused by the surface undulations of the disk, and acceleration in a track direction caused by the eccentricity of the optical disk respectively become larger as the rotational speed becomes higher. Consequently, it becomes difficult to stably maintain a focus servo state and a tracking servo state, and the focus and tracking servos become unstable and easily slip out of a locked state.

Hence, when the recording medium such as the optical disk is rotated at a high speed in the conventional storage apparatus, there were problems in that there is a possibility that the read and/or write margin may become insufficient, and that it may become difficult to stably maintain the focus servo state and the tracking servo state.

SUMMARY OF THE INVENTION

Accordingly, it is a general object of the present invention to provide a novel and useful rotation control method and storage apparatus, in which the problems described above are eliminated.

Another and more specific object of the present invention is to provide a rotation control method and a storage apparatus, which can avoid a read and/or write margin from becoming insufficient as a rotational speed of a recording medium is increased to a high speed, and can stably maintain a focus servo state and a tracking servo state.

Still another object of the present invention is to provide a rotation control method for rotating an optical recording medium at two or more kinds of rotational speeds, comprising the steps of (a) decreasing the rotational speed when a read or write margin becomes less than or equal to a first predetermined value or, when a frequency of generation of a servo abnormality of a tracking servo and/or a focus servo is greater than or equal to a first predetermined frequency, and (b) increasing the rotational speed when the read or write margin becomes greater than or equal to a second predetermined value or, when the frequency of generation of the servo abnormality of the tracking servo and/or the focus servo is less than or equal to a second predetermined frequency. According to the rotation control method of the present invention, it is possible to avoid the read and/or write margin from becoming insufficient as the rotational speed of the optical recording medium is increased to a high speed, and stably maintain the focus servo state and the tracking servo state.

A further object of the present invention is to provide a storage apparatus having a spindle motor which rotates an optical recording medium at two or more kinds of rotational speeds, comprising a first controller decreasing the rotational speed when a read or write margin becomes less than or equal to a first predetermined value or, when a frequency of generation of a servo abnormality of a tracking servo and/or a focus servo is greater than or equal to a first predetermined frequency, and a second controller increasing the rotational speed when the read or write margin becomes greater than or equal to a second predetermined value or, when the frequency of generation of the servo abnormality of the tracking servo and/or the focus servo is less than or equal to a second predetermined frequency. According to the storage apparatus of the present invention, it is possible to avoid the read and/or write margin from becoming insufficient as the rotational speed of the optical recording medium is increased to a high speed, and stably maintain the focus servo state and the tracking servo state.

Another object of the present invention is to provide a rotation control method for rotating an optical recording medium at two or more kinds of rotational speeds, comprising the steps of (a) decreasing the rotational speed when a power of a light irradiated on the optical recording medium exceeds a reference value, and (b) increasing the rotational speed when the power of the light has a margin greater than a predetermined value with respect to the reference value. According to the rotation control method of the present invention, it is possible to avoid the read and/or write margin from becoming insufficient as the rotational speed of the optical recording medium is increased to a high speed, and stably maintain the focus servo state and the tracking servo state.

Still another object of the present invention is to provide a storage apparatus having a spindle motor which rotates an optical recording medium at two or more kinds of rotational speeds, comprising a first controller decreasing the rotational speed when a power of a light irradiated on the optical recording medium exceeds a reference value, and a second controller increasing the rotational speed when the power of the light has a margin greater than a predetermined value with respect to the reference value. According to the storage apparatus of the present invention, it is possible to avoid the read and/or write margin from becoming insufficient as the rotational speed of the optical recording medium is increased to a high speed, and stably maintain the focus servo state and the tracking servo state.

Other objects and further features of the present invention will be apparent from the following detailed description when read in conjunction with the accompanying drawings.

BRIEF DESCRIPTION OF THE DRAWINGS

FIG. 3 is a diagram showing the relationships of a zone on an optical disk, a data transfer rate and a rotational speed of the optical disk;

FIG. 7 is a diagram showing the relationships of the zone on the optical disk, a recording or reproducing clock frequency and the rotational speed of the optical disk;

FIG. 11 is a diagram for explaining a buffer region provided on the optical disk;

DESCRIPTION OF THE PREFERRED EMBODIMENTS

Figure 1:
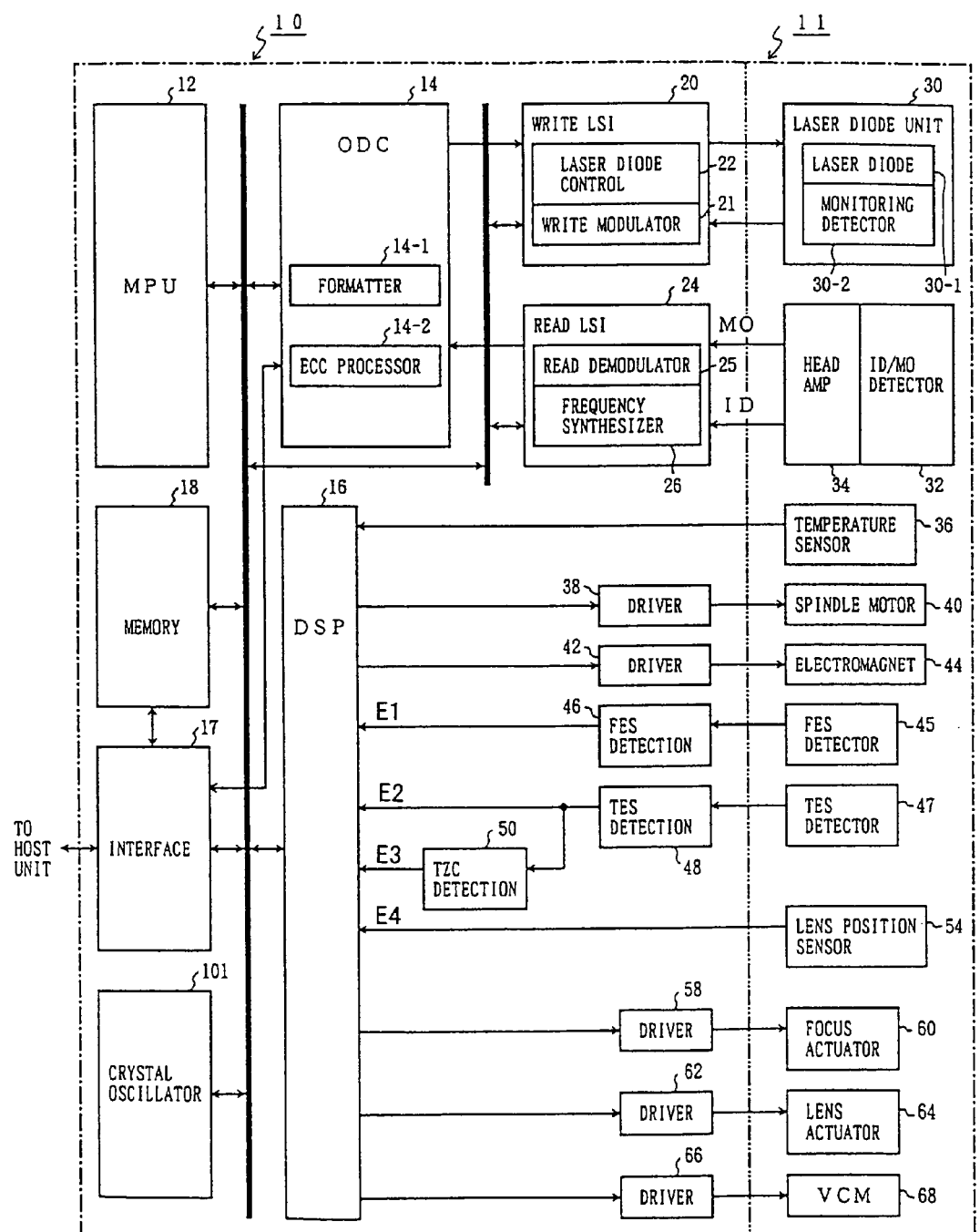
FIG. 1 is a system block diagram showing the construction of a first embodiment of a storage apparatus according to the present invention.

A description will be given of embodiments of a rotation control method according to the present invention and a storage apparatus according to the present invention, by referring to the drawings.

First, a description will be given of a first embodiment of the storage apparatus according to the present invention, by referring to FIGS. 1 and 2. FIG. 1 is a system block diagram showing the construction of this first embodiment of the storage apparatus. In this first embodiment of the storage apparatus, the present invention is applied to an optical disk unit. In addition, this first embodiment of the storage apparatus employs a first embodiment of the rotation control method according to the present invention.

As shown in FIG. 1, the optical disk unit generally includes a control unit 10 and an enclosure 11. The control unit 10 includes a microprocessor unit (MPU) 12 which generally controls the operation of the optical disk unit, an interface 17 which exchanges commands and data between a host unit (not shown), an optical disk controller (ODC) 14 which carries out processes required to read and write data with respect to an optical disk (not shown), a digital signal processor (DSP) 16, and a memory 18. The memory 18 is used in common by the MPU 12, the ODC 14 and the interface 14, and for example, includes a dynamic random access memory (DRAM), a nonvolatile memory which stores control programs and flag information, or the like. A crystal oscillator 101 is coupled to the MPU 12.

The ODC 14 includes a formatter 14-1 and an error correction code (ECC) processor 14-2. At the time of a write access, the formatter 14-1 divides NRZ write data into sector units of the optical disk and generates a recording format, and the ECC processor 14-2 generates and adds an ECC with respect to sector write data units and also generates and adds if necessary a cyclic redundancy check (CRC) code. Further, the ECC processor 14-2 converts the sector data with the encoded ECC into a 1-7 run length limited (RLL) code, for example.

At the time of a read access, a reverse conversion of the 1-7 RLL is carried out with respect to the sector data, and after carrying out the CRC, the error detection and error correction using the ECC are carried out in the ECC processor 14-2. Further, the NRZ data in sector units are connected in the formatter 14-1 so as to transfer a NRZ read data stream to the host unit.

A write large scale integrated (LSI) circuit 20 is provided with respect to the ODC 14. This write LSI circuit 20 includes a write modulator 21 and a laser diode control circuit 22. A control output of the laser diode control circuit 22 is supplied to a laser diode unit 30 which is provided in an optical unit of the enclosure 11. The laser diode unit 30 integrally includes a laser diode 30-1 and a monitoring detector 30-2. The write modulator 21 converts the write data into the data format of the pit position modulation (PPM) recording (or mark recording) or, a pulse width modulation (PWM) recording (or edge recording).

When recording and reproducing data with respect to the optical disk using the laser diode unit 30, this embodiment uses a writable magneto-optical (MO) cartridge medium employing the PWM recording which records the data in correspondence with the existence of mark edges on the optical disk. In addition, the recording format used by the optical disk is a 1.3 GB format using magnetic super resolution (MSR) and the ZCAV system. When the optical disk is loaded into the optical disk unit, an identification (ID) portion of the optical disk is first read, so as to recognize the type (storage capacity and the like) of the optical disk in the MPU 12 based on pit intervals of the ID portion. The MPU 12 notifies the recognition result indicating the type of optical disk to the ODC 14.

A read LSI circuit 24 is provided as a read system with respect to the ODC 14. A read demodulator 25 and a frequency synthesizer 26 are provided in the read LSI circuit 24. An ID/MO detector 32 of the enclosure 11 detects a laser beam emitted from the laser diode 30-1 and returned via the optical disk, and a detection signal from this ID/MO detector 32 is input as an ID signal and a MO signal to the read LSI circuit 24 via a head amplifier 34.

The read demodulator 25 of the read LSI circuit 24 includes the functions of circuits such as an automatic gain control (AGC) circuit, a filter and a sector mark detection circuit. Hence, the read demodulator 25 generates a read clock and read data from the input ID signal and MO signal, and demodulates the PWM data back into the original NRZ data. In addition, since the ZCAV system is employed, the MPU 12 controls a setting of a frequency dividing ratio with respect to the frequency synthesizer 26 of the read LSI circuit 24 in order to generate a clock frequency in correspondence with the zone.

The frequency synthesizer 26 is a phase locked loop (PLL) circuit having a programmable frequency divider, and generates as a read clock a reproducing reference clock having a predetermined specific frequency depending on the zone position on the optical disk. In other words, the frequency synthesizer 26 is formed by the PLL circuit having the programmable frequency divider, and in a normal mode, generates the recording and/or reproducing reference clock having a frequency fo based on $fo=(m/n)fi$ according to a frequency dividing ratio m/n which is set by the MPU 12 depending on a zone number.

A denominator n of the frequency dividing ratio m/n is a specific value depending on the type of optical disk. In addition, a numerator m of the frequency dividing ratio m/n is a value which changes depending on the zone position on the optical disk, and table information of the values corresponding to the zone numbers are prepared in advance with respect to each type of optical disk. Moreover, fi denotes a recording and/or reproducing reference clock frequency generated outside the frequency synthesizer 26.

The read data demodulated in the read LSI circuit 24 is supplied to the read system of the ODC 14, and after carrying out the reverse conversion of the 1-7 RLL, the CRC and the ECC processes are carried out by the encoding function of the ECC processor 14-2 so as to restore the original NRZ data. Next, the formatter 14-1 connects and converts the NRZ sector data into the NRZ data stream, and this NRZ read data stream is transferred to the host unit via the memory 18 and the interface 17.

A detection signal from a temperature sensor 36 provided in the enclosure 11 is supplied with respect to the MPU 12 via the DSP 16. Based on an environmental temperature within the optical disk unit detected by the temperature sensor 36, the MPU 12 controls the light emission powers for the read, write and erase in the laser diode control circuit 22.

The MPU 12 controls a spindle motor 40 provided in the enclosure 11 via the DSP 16 and a driver 38. In this embodiment, since the ZCAV system is employed as the recording format of the optical disk, the spindle motor 40 is rotated at a constant speed of 3637 rpm, for example.

In addition, the MPU 12 controls an electromagnet 44 provided in the enclosure 11 via the DSP 16 and a driver 42. The electromagnet 44 is arranged on a side opposite to the side of the optical disk on which the laser beam is irradiated within the optical disk unit which is loaded with this optical disk. This electromagnet 44 supplies an external magnetic field on the optical disk at the time of the recording and erasure. In the case of the optical disk having the 1.3 GB format employing the MSR, the electromagnet 44 also supplies the external magnetic field on the optical disk at the time of the MSR reproduction.

The DSP 16 is provided with a servo function for positioning the laser beam from the laser diode 30-1 with respect to the optical disk, and functions as a seek controller and an on-track controller which enable the laser beam to seek a target track and to be positioned on the target track. The seek control and the on-track control may be carried out simultaneously in parallel with the write access or the read access of the MPU 12 with respect to a host command.

In order to realize the servo function of the DSP 16, a focus error signal (FES) detector 45 is provided in the optical unit of the enclosure 11 so as to detect the laser beam emitted from the laser diode 30-1 and returned via the optical disk. A FES detection circuit 46 generates a FES E1 from a detection signal received from the FES detector 45, and inputs this FES E1 to the DSP 16.

A tracking error signal (TES) detector 47 is also provided in the optical unit of the enclosure 11 so as to detect the laser beam emitted from the laser diode 30-1 and returned via the optical disk. A TES detection circuit 48 generates a TES E2 from a detection signal received from the TES detector 47, and inputs this TES E2 to the DSP 16. The TES E2 is also input to a track zero crossing (TZC) detection circuit 50, and this TZC detection circuit 50 generates a TZC signal E3 which is input to the DSP 16.

A lens position sensor 54 is provided in the enclosure 11. This lens position sensor 54 detects a position of an object lens through which the laser beam is irradiated on the optical disk. A lens position detection signal (LPOS) E4 from the lens position sensor 54 is input to the DSP 16. The DSP 16 controls and drives a focus actuator 60, a lens actuator 64 and a voice coil motor (VCM) 68 via corresponding drivers 58, 62 and 66, so as to control the position of a beam spot formed by the laser beam on the optical disk.

Figure 2:
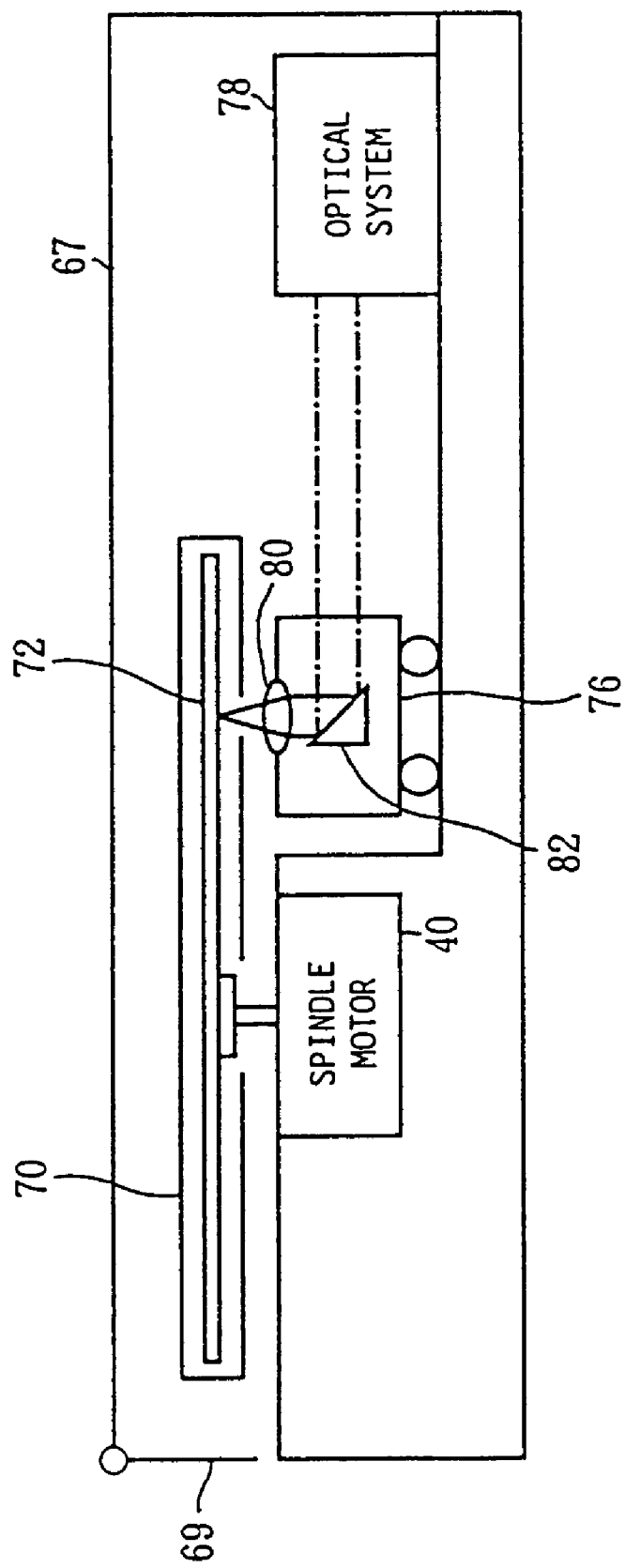
FIG. 2 is a cross sectional view showing the general construction of an enclosure.

FIG. 2 is a cross sectional view showing the general construction of the enclosure 11. As shown in FIG. 2, the spindle motor 40 is provided within a housing 67. By inserting a MO cartridge 70 into the housing 67 from the side of an inlet door 69, an optical disk (MO disk) 72 accommodated within the MO cartridge 70 engages a rotary shaft of the spindle motor 40, thereby loading the optical disk 72 with respect to the optical disk unit.

A carriage 76 is provided below the loaded optical disk 72 within the MO cartridge 70. This carriage 76 is freely movable in a direction which traverses tracks on the optical disk 72 when driven by the VCM 64. An objective lens 80 is mounted on the carriage 76. The laser beam emitted from the laser diode 30-1 which is provided within a fixed optical system 78 is reflected by a mirror 82, and is irradiated on the recording surface of the optical disk 72 via the objective lens 80, thereby forming a beam spot on the recording surface.

The movement of the objective lens 80 along an optical axis is controlled by the focus actuator 60 of the enclosure shown in FIG. 1. In addition, the objective lens 80 is movable in a radial direction which traverses the tracks on the optical disk 72 by the lens actuator 64, within a range of several tens of tracks. The position of the objective lens 80 mounted on the carriage 76 is detected by the lens position sensor 54 shown in FIG. 1. The lens position sensor 54 outputs the lens position detection signal E4 which takes a value zero at a neutral position where the optical axis of the objective lens 80 is perpendicular to the recording surface of the optical disk 72, and has a magnitude and a polarity depending on the amount the optical axis of the objective lens 80 moves towards the inner or outer peripheral side of the optical disk 72.

Since the ZCAV system is employed, the optical disk 72 is divided into a plurality of zones in the radial direction thereof. In the normal mode, the optical disk 72 is rotated at a constant rotational speed by the spindle motor 40, and the recording and/or reproducing reference clock has the same frequency within each of the zones. In addition, the frequency of the recording and/or reproducing clock is set higher for the outer peripheral side of the optical disk 72 than the inner peripheral side of the optical disk 72. In this embodiment, this optical disk 72 is divided into a number of areas less than or equal to the number of zones, from the outer peripheral side to the inner peripheral side of the optical disk 72. Furthermore, the spindle motor 40 is controlled so that the rotational speed of the optical disk 72 becomes higher towards the inner peripheral side for every area. In other words, in a high-speed mode, the rotational speed of the optical disk 72 is switched in each area by a number of times such that undesirable effects on the random access performance are suppressed, and the recording and/or reproducing clock and the recording and/or reproducing power in the laser diode control circuit 22 are switched accordingly. Hence, in the normal mode, a high random access performance is obtained because the optical disk 72 which employs the ZCAV system is used in conformance with the ZCAV system. On the other hand, in the high-speed mode, a high data transfer rate is obtained during the recording and/or reproduction with respect to the optical disk 72 because the optical disk 72 which employs the ZCAV system is used in conformance with a kind of ZCLV system.

In the normal mode, the rotational speed of the optical disk 72 is controlled to be constant. On the other hand, the rotational speed of the optical disk 72 is switched and controlled in a plurality of stages.

Figure 4:
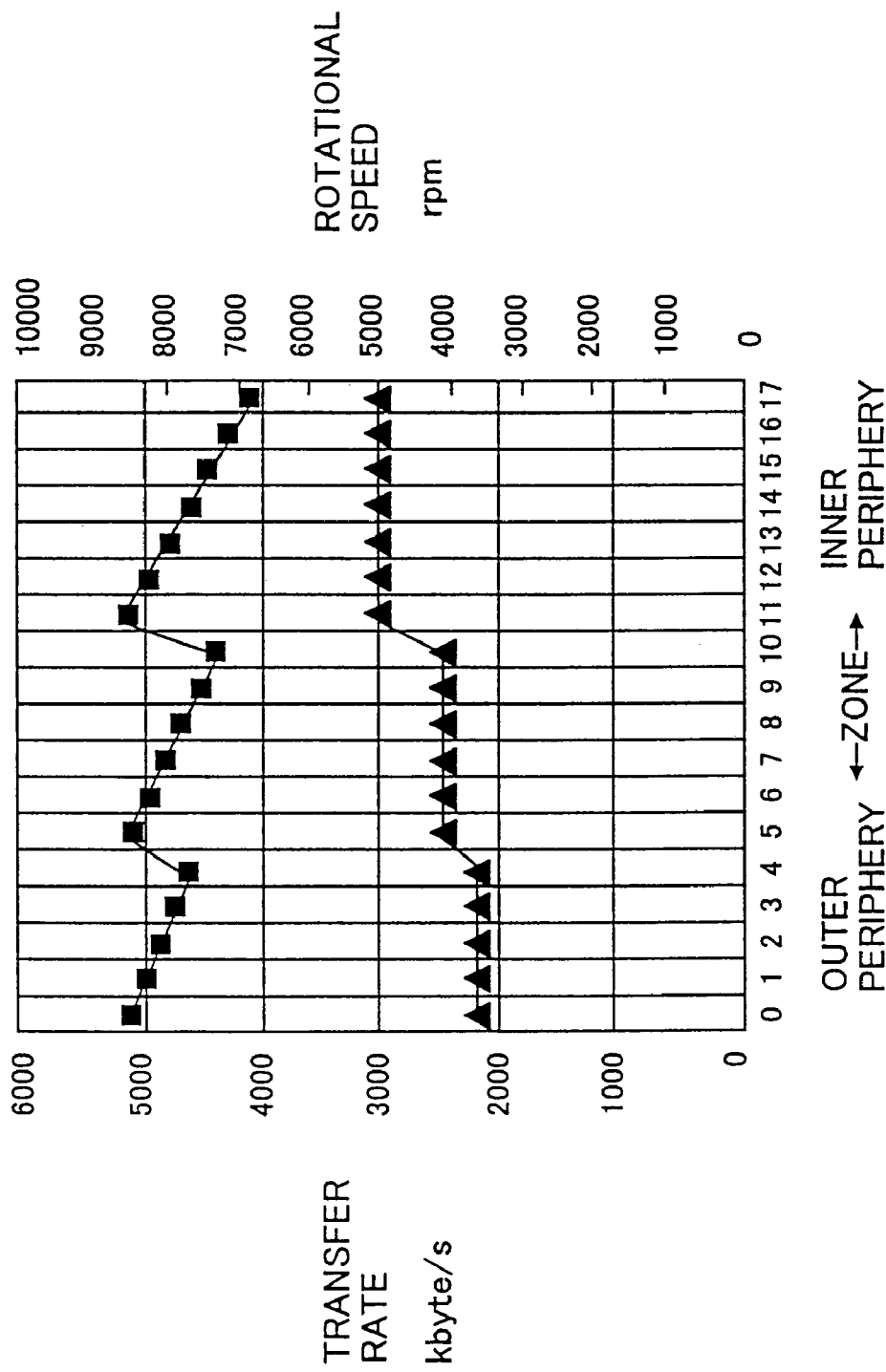
FIG. 4 is a diagram showing the relationships of the data transfer rate and the rotational speed of the optical disk with respect to the zone on the optical disk.

FIG. 3 is a diagram showing the relationships of the zone on the optical disk 72, the data transfer rate and the rotational speed of the optical disk 72. For the sake of convenience, FIG. 3 shows a case where one area is made up of zone units, but as described above, the relationship between the area and the zone is not limited to that shown in FIG. 3. In addition, FIG. 4 is a diagram showing the relationships of the data transfer rate and the rotational speed of the optical disk 72 with respect to the zone on the optical disk 72. In FIG. 4, a rectangular mark indicates the data transfer rate, and a triangular mark indicates the rotational speed of the optical disk 72. FIGS. 3 and 4 show the relationships for a case where the optical disk 72 has a storage capacity of 1.3 GB and the rotational speed of the optical disk 72 can be switched among three rotational speeds in the high-speed mode. Furthermore, it is assumed for the sake; of convenience that a zone 0 is located on the outer peripheral side of the optical disk 72 and a zone 17 is located on the inner peripheral side of the optical disk 72.

In the high-speed mode, in the zone 17 located at the innermost peripheral side of the optical disk 72, for example, the rotational speed of the optical disk 72 is switched to 5001 rpm, and the data transfer rate is 4097 Kbyte/s. In the normal mode, the rotational speed is 3637 rpm and the data transfer rate is 2979 Kbyte/s in the zone 17, and it may be seen that the data transfer rate is improved in the high-speed mode. Accordingly, it is possible to obtain a desired data transfer rate on the order of approximately 3700 to 3800 Kbyte/s. In this embodiment, the upper limit of the data transfer rate is restricted to 5121 Kbyte/s or less due to a limit frequency of the circuit, and for this reason, it is not possible to operate at the rotational speed of 5001 rpm in the zones 0 through 10 located on the outer peripheral side of the zone 11. However, the rotational speeds and the data transfer rates which are switched are of course not limited to those shown in FIGS. 3 and 4, and the number of switchable rotational speeds is not limited to three.

In the case of a continuous data such as video and music data amounting to a large amount of data, the video or music stops during the recording and/or reproduction to generate an image distortion, frame dropout and the like, unless the data transfer rate is maintained over a reference value. The data transfer rate during the recording and/or reproduction of a digital video (DV) format is 3700 to 3800 Kbyte/s, and the image and sound becomes discontinuous if the data transfer rate is lower than this data transfer rate range. In the case shown in FIG. 3, the data transfer rate is lower than 3700 Kbyte/s on the inner peripheral side of the zones 12 through 17 when the rotational speed is 3637 rpm, and it may be seen that this data transfer rate is not suited for the recording and/or reproduction of the continuous data such as the video and music data amounting to the large amount of data. Hence, the rotational speed is switched to 5001 rpm, so that the data transfer rate of 3700 to 3800 Kbyte/s is guaranteed from the inner peripheral side to the outer peripheral side of the optical disk 72. Because of the limit frequency of the circuit, it is not possible to set the rotational speed to 5001 rpm or higher at all areas on the optical disk 72, and for this reason, an area where the rotational speed is set to 4138 rpm is also provided on the optical disk 72. In this manner, the rotational speed of the optical disk 72 is changed depending on the area, so that the data transfer rate becomes 3700 to 3800 Kbyte/s or greater at all areas from the inner peripheral side to the outer peripheral side of the optical disk 72.

Figure 5:
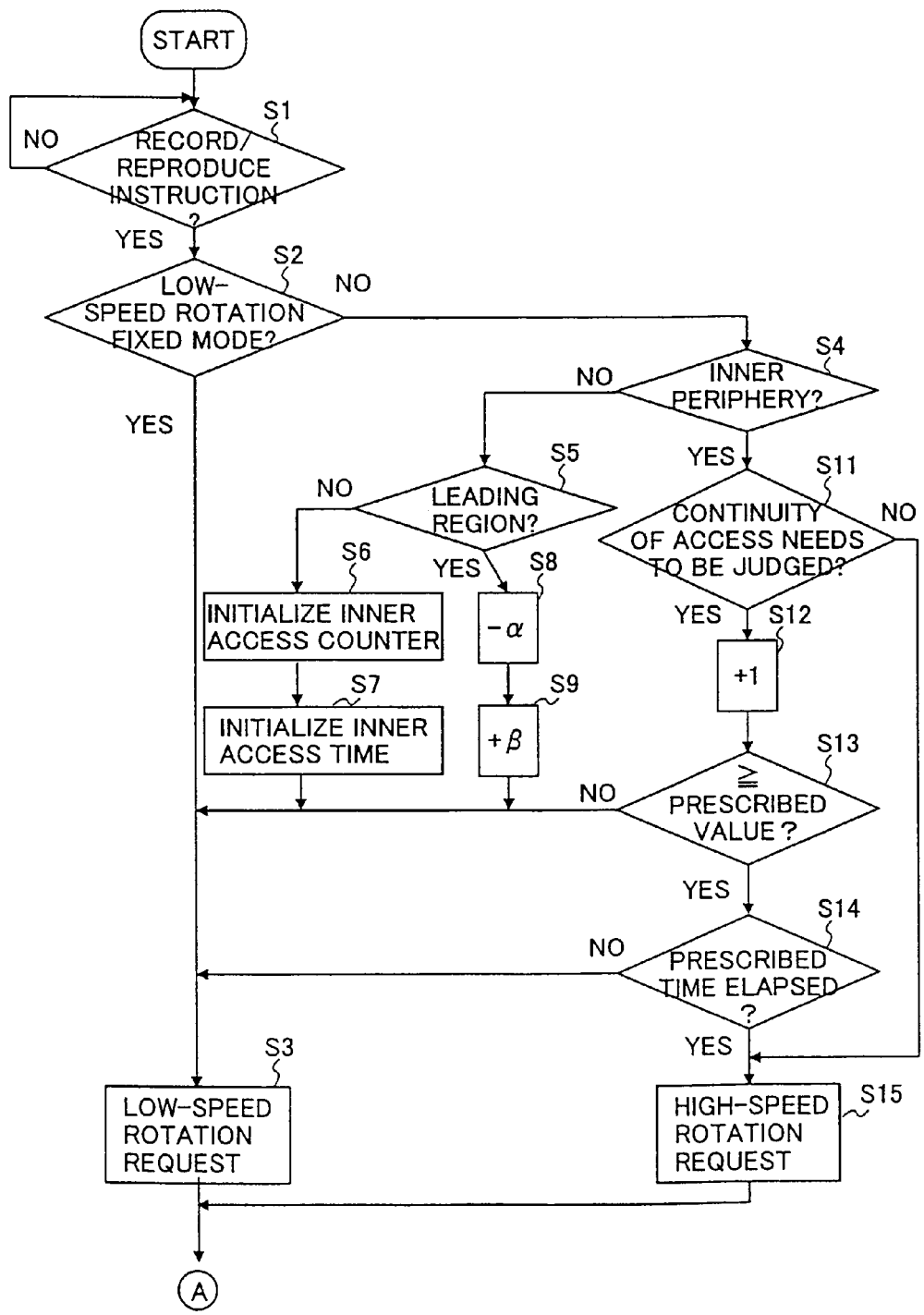
FIG. 5 is a flow chart for explaining the operation of a MPU of the first embodiment.
Figure 6:
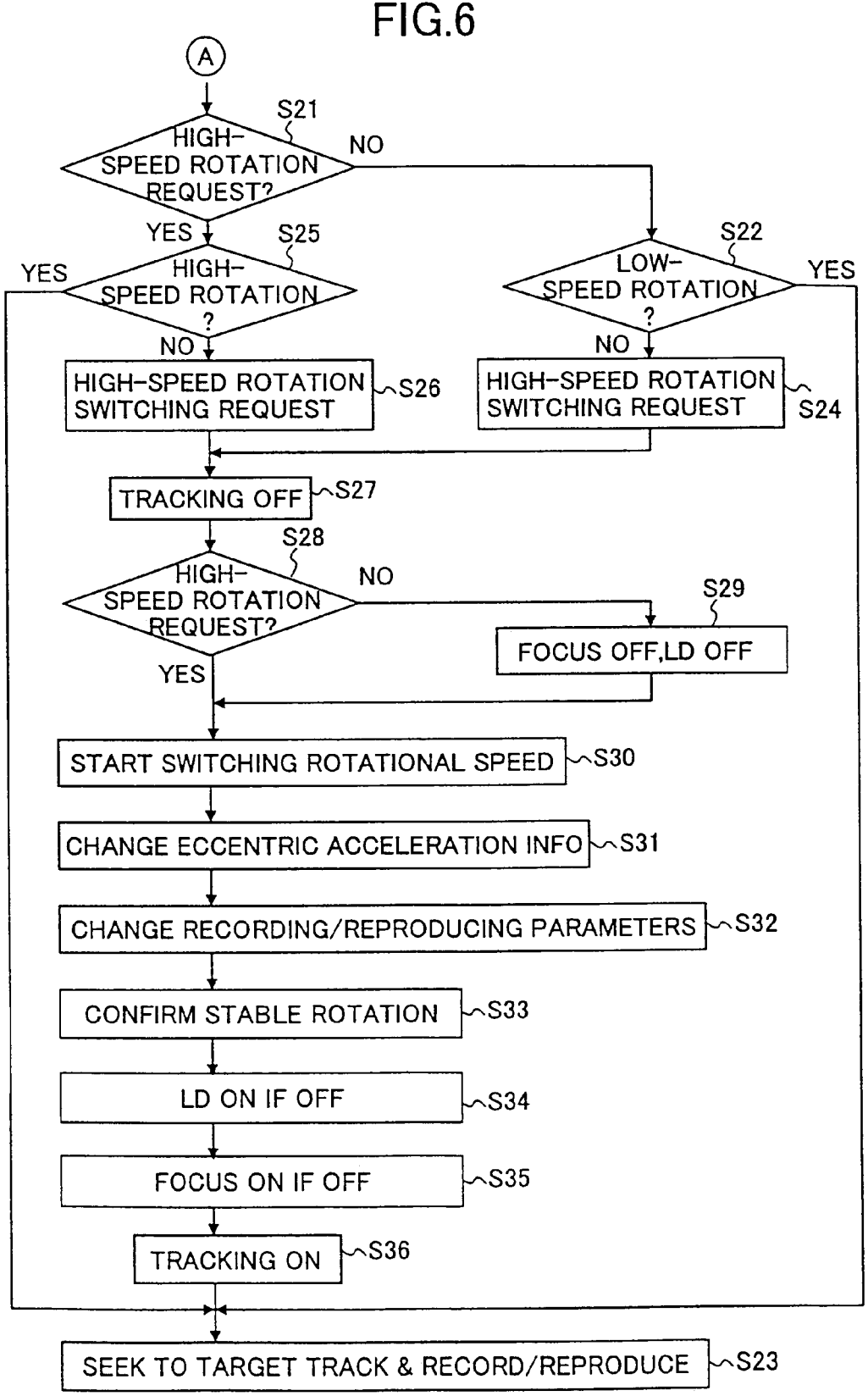
FIG. 6 is a flow chart for explaining the operation of the MPU of the first embodiment.

FIGS. 5 and 6 are flow charts for explaining the operation of the MPU 12 of this embodiment.

In FIG. 5, a step S1 decides whether or not a recording or reproducing instruction is issued from the host unit. If the decision result in the step S1 is YES, a step S2 decides whether or not a normal mode, that is, a low-speed rotation fixed mode of the ZCAV system, is instructed. If the decision result in the step S2 is YES, a step S3 sets a low-speed rotation request, and the process advances to a step S21 shown in FIG. 6 which will be described later.

On the other hand, if the decision result in the step S2 is NO, a kind of mode of the ZCLV system is instructed, and thus, a step S4 decides whether or not the present recording or reproducing position is located at a position recordable or reproducible in the high-speed mode, that is, whether or not the present recording or reproducing position is located on the inner peripheral side of a position where a high-speed rotation is possible. If the decision result in the step S4 is NO, a step S5 decides whether or not the present recording or reproducing position is on the outermost peripheral side of the optical disk 72, that is, in a vicinity of a leading region of the optical disk 72. If the decision result in the step S5 is NO, a step S6 initializes an inner access counter within the MPU 12, a step S7 initializes an inner access time managed within the MPU 12, and the process advances to the step S3. In addition, if the decision result in the step S5 is YES, a step S8 decreases a value of the inner access counter by α, a step S9 increases a value of the inner access time by β, and the process advances to the step S3.

Therefore, in the leading region of the optical disk 72, the conditions for judging continuity of the access is relaxed, so that the rotational speed increases more easily. Regions for managing a state of use of the files, such as a FAT region and a directory region, are provided in the leading region of the optical disk 72. Even when the host unit carries out a sequential process with respect to a region on the inner peripheral side of the optical disk 72, an access to the leading region is generated since the directory region is occasionally updated in order to update or add the file information. Accordingly, by relaxing the conditions for judging the continuity of the access, even if the rotational speed decreases due to the updating of only the directory information during the sequential process, the rotational speed increases before the random access so as to prevent the random access performance from deteriorating.

If the decision result in the step S4 is YES, a step S11 decides whether or not the continuity of the access needs to be judged. The process advances to a step S15 which will be described later if the decision result in the step S11 is NO. ON the other hand, if the decision result in the step S11 is YES, a step S12 increments the inner access counter by one, and a step S13 decides whether or not the value of the inner access counter is greater than or equal to a prescribed value. The process advances to the step S3 if the decision result in the step S13 is NO, and the process advances to a step S14 if the decision result in the step S13 is YES. The step S14 decides whether or not a prescribed time has elapsed from a last outer access which is made in a low-speed mode, and the process advances to the step S3 if the decision result in the step S14 is NO. If the decision result in the step S14 is YES or the decision result in the step S11 is NO, the step S15 sets a high-speed rotation request for recording or reproducing in the high-speed mode, and the process advances to the step S21 shown in FIG. 6.

The prescribed time described above is set so that the rotational speed of the optical disk 72 which once decreases does not easily increase again, to thereby prevent deterioration of the random access performance and the decrease of the data transfer rate which would otherwise occur if the rotational speed were frequently switched.

In FIG. 6, the step S21 decides whether or not the high-speed rotation request exists, and the process advances to a step S22 if the decision result in the step S21 is NO. The step S22 decides whether or not the present mode is the normal mode, that is, the optical disk 72 is undergoing low-speed rotation. If the decision result in the step S22 is YES, a step S23 carries out a seek to a target track on the optical disk 72, to carry out a recording or reproduction. If the decision result in the step S22 is NO, a step S24 sets a low-speed rotation switching request, and the process advances to a step S27 which will be described later.

If the decision result in the step S21 is YES, a step S25 decides whether or not the present mode is the high-speed mode, that is, the optical disk 72 is undergoing a high-speed rotation. The process advances to the step S23 if the decision result in the step S21 is YES. If the decision result in the step S25 is NO or after the step S24, the step S27 turns OFF the tracking servo based on the TES E2. A step S28 decides whether or not the high-speed rotation request exists. If the decision result in the step S28 is NO, a step S29 turns OFF the focus servo based on the FES E1, and turns OFF the laser diode 30-1, in order to prevent the data on the optical disk 72 from being destroyed. If the decision result in the step S28 is YES or after the step S29, a step S30 starts switching of the rotational speed. The switching of the rotational speed may be carried out based on a table which indicates the relationships shown in FIG. 3, for example, by storing the table in the memory 18, for example.

A step S31 changes eccentric acceleration information depending on the new rotational speed of the optical disk 72 after the switching of the rotational speed. The eccentric acceleration information is changed by replacing contents (eccentric acceleration information) of an eccentric acceleration table within the memory 18, for example, or by recalculating the eccentric acceleration information, depending on the new rotational speed. The eccentric acceleration information relates to the acceleration which is generated due to the eccentricity of the optical disk 72, and will be described later. A step S32 changes various recording or reproducing parameters which are used during the recording or reproduction, depending on the new rotational speed. A step S33 confirms the stabilized rotation of the optical disk 72. A step S34 turns ON the laser diode 30-1 if the laser diode 30-1 is OFF. A step S35 turns ON the focus servo if the focus servo is OFF. In addition, a step S36 turns ON the tracking servo if the tracking servo is OFF, and the process advances to the step S23.

By the operation described above, it is possible to carry out a process (1) which switches and sets between the low-speed rotation fixed mode and the rotational speed switching mode, and a process (2) which switches and sets whether or not to judge the continuity of the access in the rotational speed switching mode. The process (1) can be carried out by setting a flag which is used for the decision in the step S2 shown in FIG. 5. In addition, the process (2) can be carried out by setting a flag which is used for the decision in the step S11 shown in FIG. 5 in a state where the process (1) sets the rotational speed switching mode. Methods of setting these flags are not limited to specific methods. For example, a method which sets the mode from the host unit, a method which sets the mode in a nonvolatile memory within the memory 18, and a method which writes mode setting information on the optical disk 72 from the host unit and sets the mode based on the written mode setting information may be used to set these flags.

Figure 8:
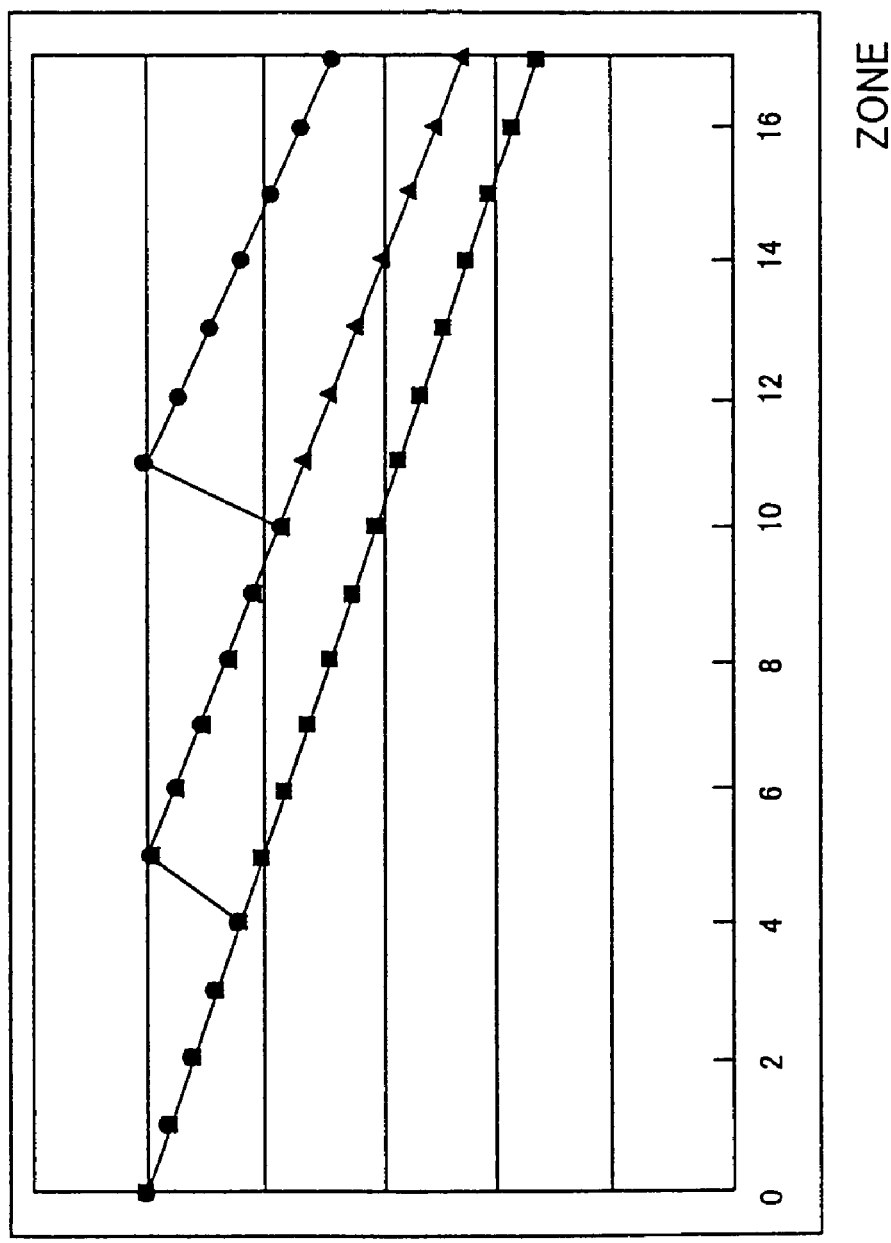
FIG. 8 is a diagram showing the relationships of the zone on the optical disk, a recording or reproducing power and the rotational speed of the optical disk.

The recording or reproducing parameters set in the step S32 shown in FIG. 6 include the recording or reproducing clock frequency and the recording or reproducing power of the laser diode 30-1. FIGS. 7 and 8 are diagrams for explaining the recording or reproducing parameters which are changed.

FIG. 7 is a diagram showing the relationships of the zone on the optical disk 72, the recording or reproducing clock frequency and the rotational speed of the optical disk 72. In FIG., the unit of the recording or reproducing clock frequency is MHz.

FIG. 8 is a diagram showing the relationships of the zone on the optical disk 72, the recording or reproducing power and the rotational speed of the optical disk 72. In FIG. 8, a rectangular mark indicates a case where the rotational speed is 3637 rpm, a triangular mark indicates a case where the rotational speed is 4138 rpm, and a circular mark indicates a case where the rotational speed is 5001 rpm.

For example, as proposed in a Japanese Laid-Open Patent Application No. 11-73669, a test write obtains an error quantity of an optimum recording or reproducing power with respect to a default recording or reproducing power of a power default table, so as to optimize the recording or reproducing power. For this reason, this embodiment does not need to carry out the test write every time the rotational speed is switched. In other words, when the rotational speed is switched, it is only necessary to switch the power default table corresponding to each rotational speed, and the optimum recording or reproducing power at each rotational speed can be optimized by correcting the default recording or reproducing power of the corresponding power default table by the same error quantity.

Furthermore, this embodiment can minimize the processing time, because the process of changing the parameters dependent on the rotational speed of the optical disk 72, such as the eccentric acceleration information and the recording or reproducing parameters, is carried out in parallel with the process of switching the rotational speed.

Figure 9:
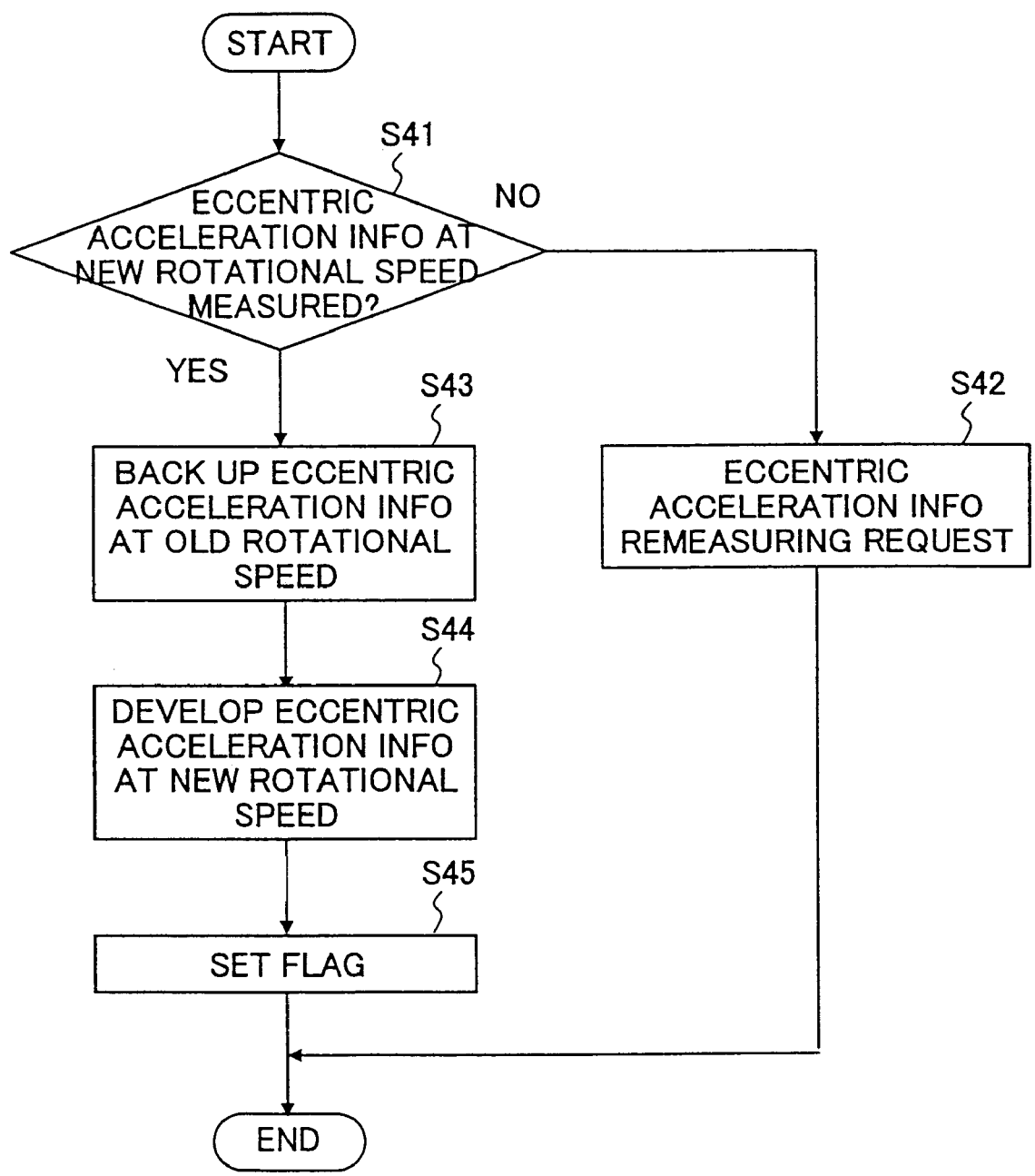
FIG. 9 is a flow chart for explaining an eccentric acceleration information switching process.

FIG. 9 is a flow chart for explaining an eccentric acceleration information switching process of the step S31 shown in FIG. 6. In this embodiment, it is assumed for the sake of convenience that the eccentric acceleration information switching process is carried out by the DSP 16 under the control of the MPU 12. In FIG. 9, a step S41 decides whether or not the eccentric acceleration information at the new rotational speed of the optical disk 72 is already measured in the past. If the decision result in the step S41 is NO, a step S42 sets an eccentric acceleration information remeasuring request, and the process ends. Hence, the eccentric acceleration information at the new rotational speed is measured by a known method and is stored in the eccentric acceleration table. For example, methods of measuring and learning the eccentric acceleration information are proposed in a Japanese Laid-Open Patent Application No. 2000-339729.

On the other hand, if the decision result in the step S41 is YES, a step S43 provides a backup for the eccentric acceleration information corresponding to the old rotational speed and stored in the memory within the DSP 16 or in the memory 18. A step S44 develops the eccentric acceleration information corresponding to the new rotational speed in the memory within the DSP 16 or in the memory 18. A step S45 sets a flag with respect to the eccentric acceleration information corresponding to the old rotational speed, and the process ends.

The eccentric acceleration information changes when the rotational speed of the optical disk 72 changes, and thus, it is necessary to obtain the eccentric acceleration information depending on the rotational speed. Because it takes time to measure and store the eccentric acceleration information, it is desirable not to carry out the process of remeasuring the eccentric acceleration information as much as possible when the rotational speed is switched. Hence, this embodiment decides whether or not the eccentric acceleration information corresponding to the new rotational speed is already measured, and if in the affirmative, this embodiment merely replaces the contents of the eccentric acceleration table, so as to minimize the processing time by omitting the remeasuring process.

Figure 10:
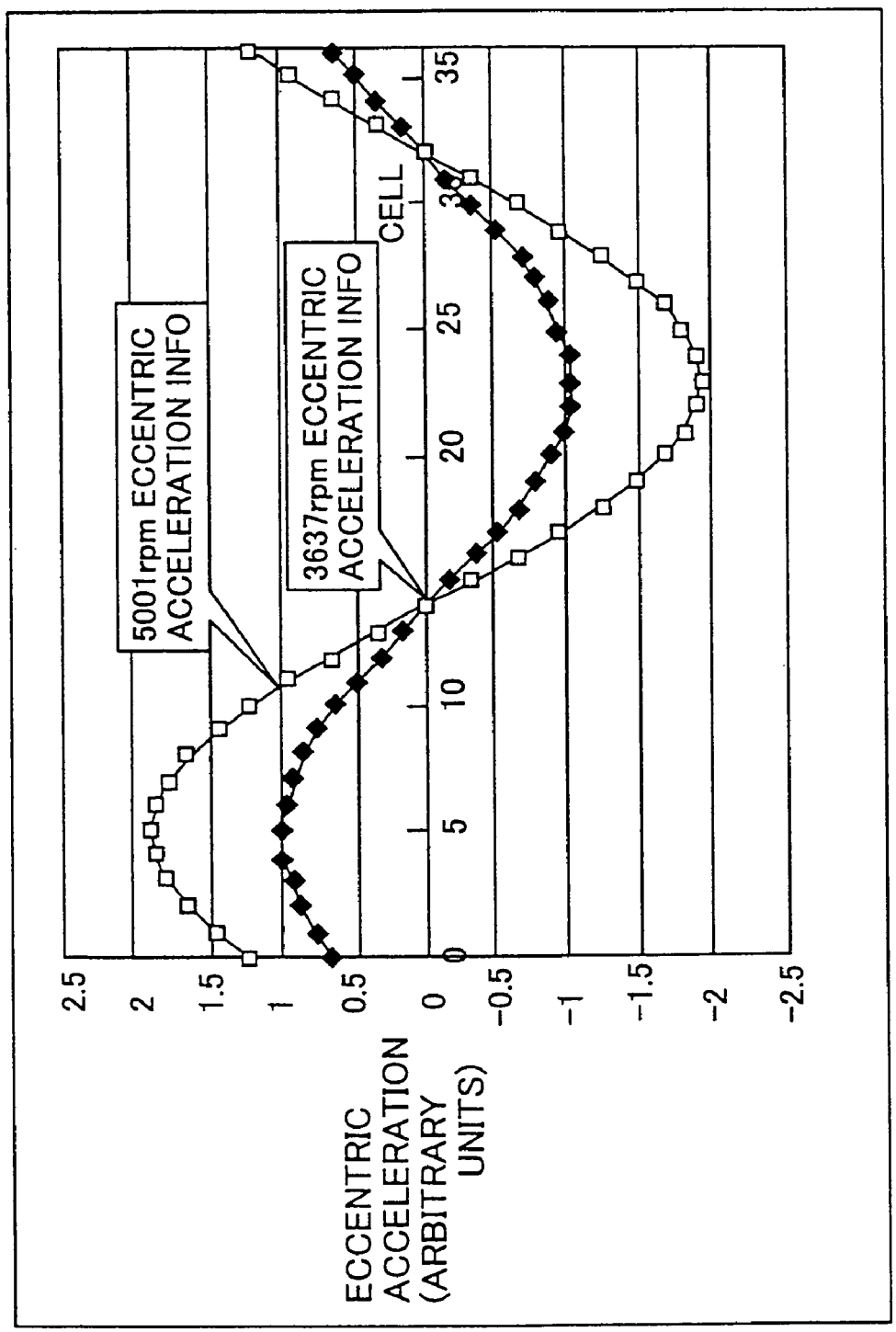
FIG. 10 is a diagram for explaining the eccentric acceleration information switching process.

FIG. 10 is a diagram for explaining the eccentric acceleration information switching process of the step S31 shown in FIG. 6. More particularly, FIG. 10 is a diagram for explaining a case where the eccentric acceleration information is switched by calculation. In FIG. 10, the ordinate indicates the eccentric acceleration in arbitrary units, and the abscissa indicates a memory cell number in the memory within the DSP 16 or in the memory 18. In addition, a rectangular mark indicates the eccentric acceleration corresponding to a case where the rotational speed is 5001 rpm, and a diamond mark indicates the eccentric acceleration corresponding to a case where the rotational speed is 3637 rpm.

In the DSP 16, a reference signal indicating one rotation of the optical disk 72 is generated based on a signal obtained via the read LSI circuit 24 and the ODC 14. This reference signal maintains the relationship with respect to a position along a circumferential direction of the optical disk 72 even when the rotational speed of the optical disk 72 changes. Accordingly, the DSP 16 calculates the eccentric acceleration information (eccentric acceleration transition) amounting to one rotation based on the reference signal, and successively stores the eccentric acceleration information in the memory cell numbers of the memory within the DSP 16 or within the memory 18. For the sake of convenience, FIG.

10 shows a case where the eccentric acceleration information of the eccentric acceleration table corresponding to the rotational speed of 5001 rpm is calculated from the eccentric acceleration information of the eccentric acceleration table corresponding to the rotational speed of 3637 rpm. Accordingly, the eccentric acceleration in this case becomes $(5001/3637)^2$ times when the rotational speed of the optical disk 72 changes, and an eccentric acceleration table is calculated in which the eccentric acceleration information stored in the memory cell numbers is multiplied by $(5001/3637)^2$. Furthermore, since the elapsed time corresponding to one memory cell is multiplied by $(3637/5001)$, if an updating time of the memory cells for the case where the rotational speed is 3637 rpm is denoted by 1, the parameters are set with respect to the DSP 16 so that the memory cells are updated $1\times(3637/5001)$ at a time for the case where the rotational speed is 5001 rpm.

Therefore, according to this embodiment, it is possible to an optimum random access performance or data transfer rate depending on the needs, by switching the table of the recording or reproducing parameters, such as the recording or reproducing clock frequency, the recording or reproducing power and the eccentric acceleration information, when the rotational speed of the optical disk 72 is switched.

FIG. 11 is a diagram for explaining a buffer region provided on the optical disk 72. As indicated by a rectangular surrounding mark in FIG. 11, the buffer region may be provided at a boundary portion of the optical disk 72 between a region which is accessible in the normal mode and a region which is accessible in the high-speed mode. In this case, when an access request to the region which is accessible in the high-speed mode is generated in the normal mode, it is detected that the access is generated with respect to the region located on the inner peripheral side of the buffer region on the optical disk 72, and the optical disk 82 is rotated at the high rotational speed to switch the mode to the high-speed mode. In other words, the operation of the MPU 12 in this case is substantially the same as the operation of the first embodiment, except that the buffer region is recognized.

When an access request to a certain region on the outer peripheral side of the optical disk 72 is generated in the high-speed mode, and this certain region is the buffer region, it is possible not to immediately switch to the normal mode, but to switch to the normal mode when an access request to a region on the outer peripheral side of the buffer region is generated. In addition, when an access request to a region of the optical disk 72 accessible in the high-speed mode is generated, it is possible not to immediately switch the rotational speed of the optical disk 72 to the high rotational speed, but to measure the state of the access and to switch the rotational speed to the high rotational speed only when an access to a region located on the inner peripheral side of the buffer region of the optical disk 72 is consecutively generated. Moreover, when an access request to a region on the outer peripheral side of the optical disk 72 is generated during access to a region on the inner peripheral side of the optical disk 72 in the high-speed mode, it is also possible to immediately switch the rotational speed of the optical disk 72 to the rotational speed of the region on the outer peripheral side of the optical disk 72.

Accordingly, by providing the buffer region on the optical disk 72 and switching the rotational speed of the optical disk 72 in a hysteresis manner, frequent occurrences of the consecutive access and switching of the rotational speed can be suppressed, so that it is possible to prevent deterioration of the random access performance and the data transfer rate.

As a modification of the first embodiment described above, it is possible to disable the mode switching operation, so that the mode is fixed to the normal mode or the high-speed mode. In this case, the MPU 12 can disable the mode switching operation in response to a mode fixing request from the host unit. Such a mode fixing request may be generated based on an instruction from the user who uses the host unit or, generated by linking with an application software of the host unit.

When the optical disk 72 is rotated at the high speed, there is a possibility that inconveniences may occur. The inconveniences are that the read and/or write margin may become insufficient, and the focus servo and the tracking servo may become unstable. Hence, in this embodiment, the rotational speed of the optical disk 72 is decreased when such inconveniences occur, so as to increase the read and/or write margin and to stabilize the focus servo and the tracking servo.

More particularly, when it is judged that the read and/or write performance is deteriorating during the high-speed rotation of the optical disk 72, the rotational speed of the optical disk 72, that is, the rotational speed of the spindle motor 40, is decreased. In addition, when it is judged that a sufficient read and/or write margin can be secured even if the rotational speed of the optical disk 72 which is rotating at the low speed is increased back to the high speed, the rotational speed of the optical disk 72 is increased.

On the other hand, when the eccentricity of the optical disk 72 is measured at the time of loading the optical disk 72 into the optical disk unit and the amount of eccentricity is extremely large, the rotational speed of the optical disk 72 is decreased to the low speed because the focus servo and the tracking servo may become unstable in the state where the optical disk 72 rotates at the high speed. Moreover, when the focus servo and/or the tracking servo slips out of the locked state (servo abnormality occurs) at a high frequency of occurrence, there is a high possibility that the servo will stabilize if the rotational speed of the optical disk 72 is decreased to the low speed. It may be regarded that the state in which the amount of eccentricity is large, that is, the state in which the servo abnormality occurs at a high frequency of occurrence, will continue until the optical disk 72 is unloaded and ejected from the optical disk unit. Accordingly, when the rotational speed of the optical disk 72 is decreased to the low speed in such a state, the low speed is maintained until the optical disk 72 is ejected from the optical disk unit.

In the following description, a "low-speed rotation" and a "high-speed rotation" respectively refer to the rotating state of the optical disk 72, that is, the rotating state of the spindle motor 40. For the sake of convenience, it is assumed in this embodiment that the "high-speed rotation" is one of the rotational speeds in the high-speed mode, and the "low-speed rotation" is the rotational speed in the normal mode, but the "high-speed rotation" and the "low-speed rotation" are of course not-limited to such. For example, in a case where the optical disk unit does not have the normal mode and the high-speed mode, the "high-speed rotation" may refer to a rotational state of the optical disk during normal use, and the "low-speed rotation" may refer to a special auxiliary state when it is judged that there is no sufficient read and/or write margin.

Figure 12:
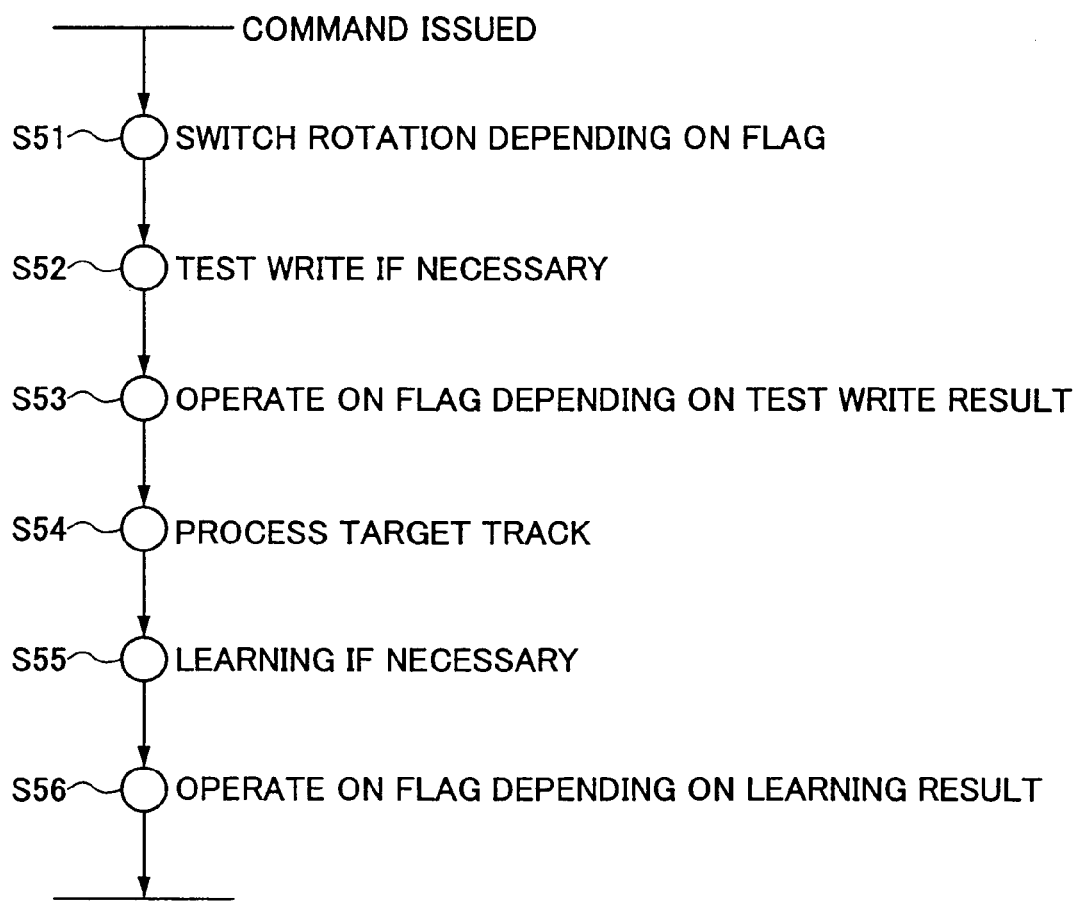
FIG. 12 is a flow chart for explaining a flag operating process of the first embodiment.

Next, a description will be given of a flag operating process of this first embodiment. FIG. 12 is a flow chart for explaining the flag operating process of this first embodiment, and corresponds to the first embodiment of the rotation control method. The process shown in FIG. 12 is carried out by the MPU 12.

The flag operating process shown in FIG. 12 is started when the MPU 12 receives a read or write command which is issued from the host unit. A step S51 switches the rotational speed of the optical disk 72 depending on a low-speed rotation request flag. A step S52 carries out a known test write process, if necessary. A step S53 operates on the low-speed rotation request flag depending on a result of the test write process. A step S54 carries out a process on a target track, and a step S55 carries out a learning process with respect to the read or write process, if necessary. A step S56 carries out an operation on the low-speed rotation request flag depending on a result of the learning process, and the flag operating process ends.

In other words, when the write command is issued from the host unit, for example, the rotational speed is switched depending on the low-speed rotation request flag. If the optical disk 72 is in the high-speed rotation state and the low-speed rotation request flag is set, the state is switched to the low-speed rotation state. On the other hand, if the optical disk 72 is in the low-speed rotation state and the low-speed rotation request flag is cleared (reset), the state is switched to the high-speed rotation state. Thereafter, the test write process is carried out if necessary, and the operation is carried out on the low-speed rotation request flag depending on the result of the test write process. During the process carried out on the target track, a known erase-write-verify process is carried out with respect to the target track. The learning process is carried out, if necessary, depending on the result of this process carried out with respect to the target track. Then, the operation is carried out on the low-speed rotation request flag depending on the result of the learning process.

Figure 13:
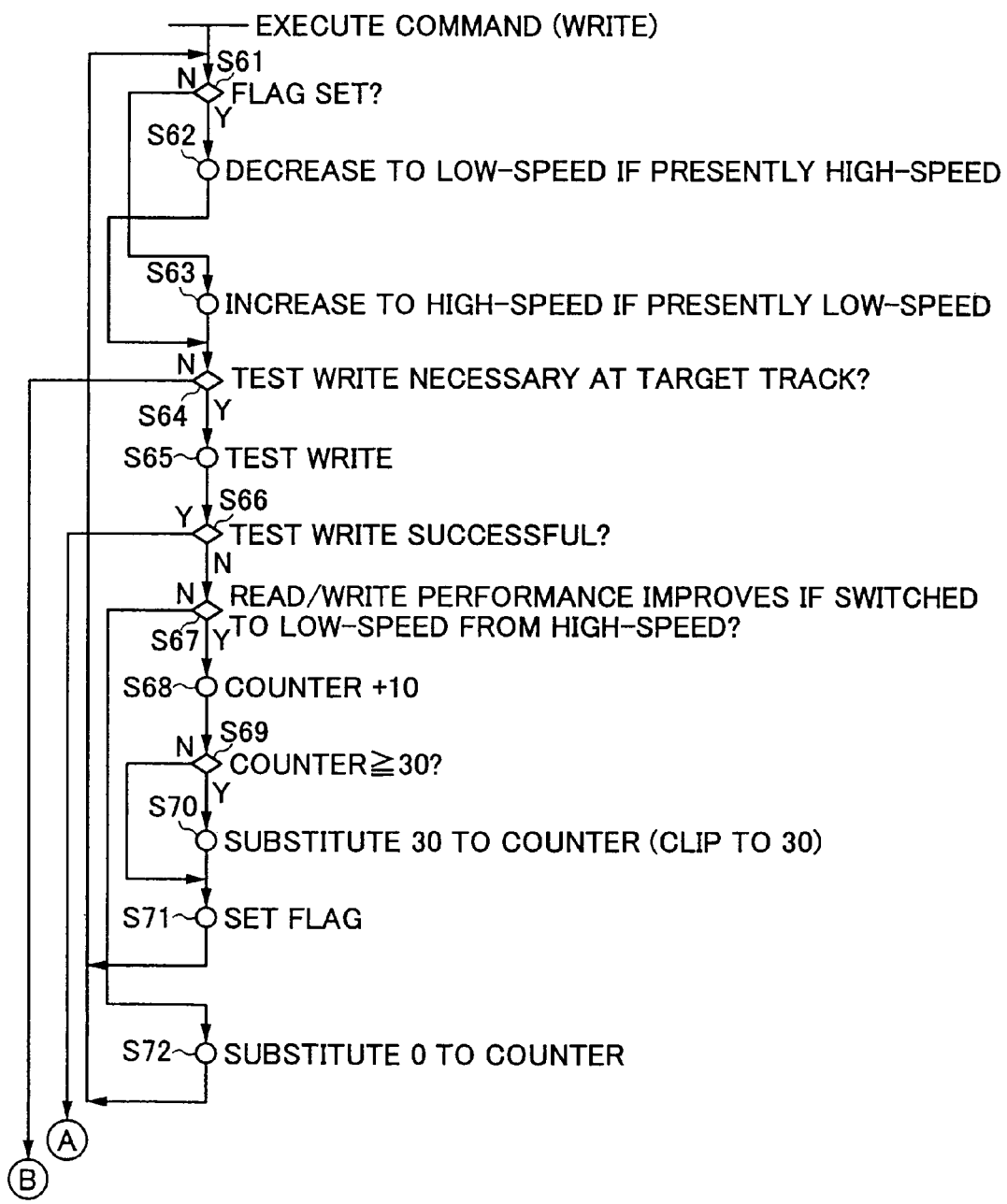
FIG. 13 is a flow chart for explaining the flag operating process in more detail.
Figure 14:
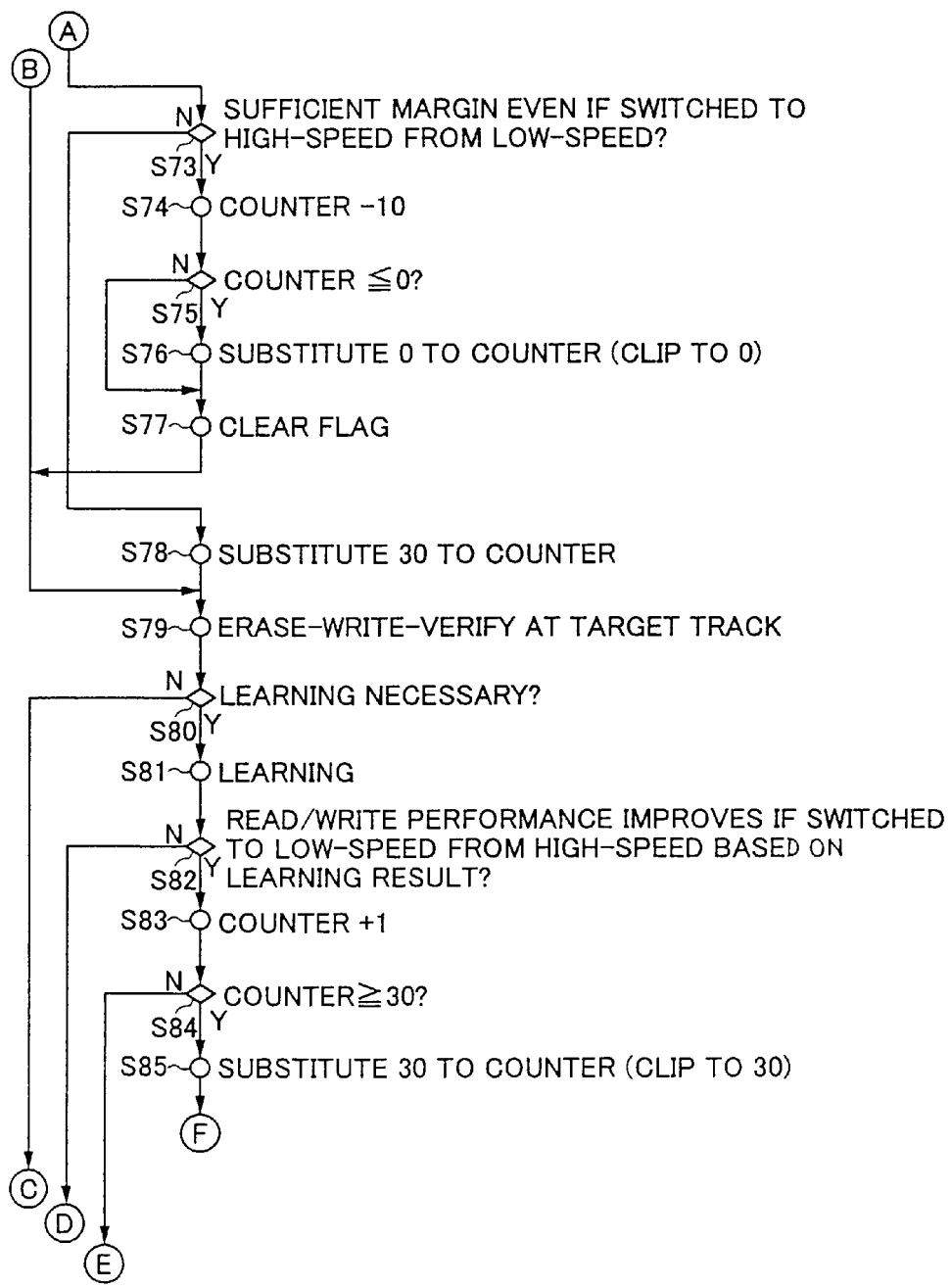
FIG. 14 is a flow chart for explaining the flag operating process in more detail.
Figure 15:
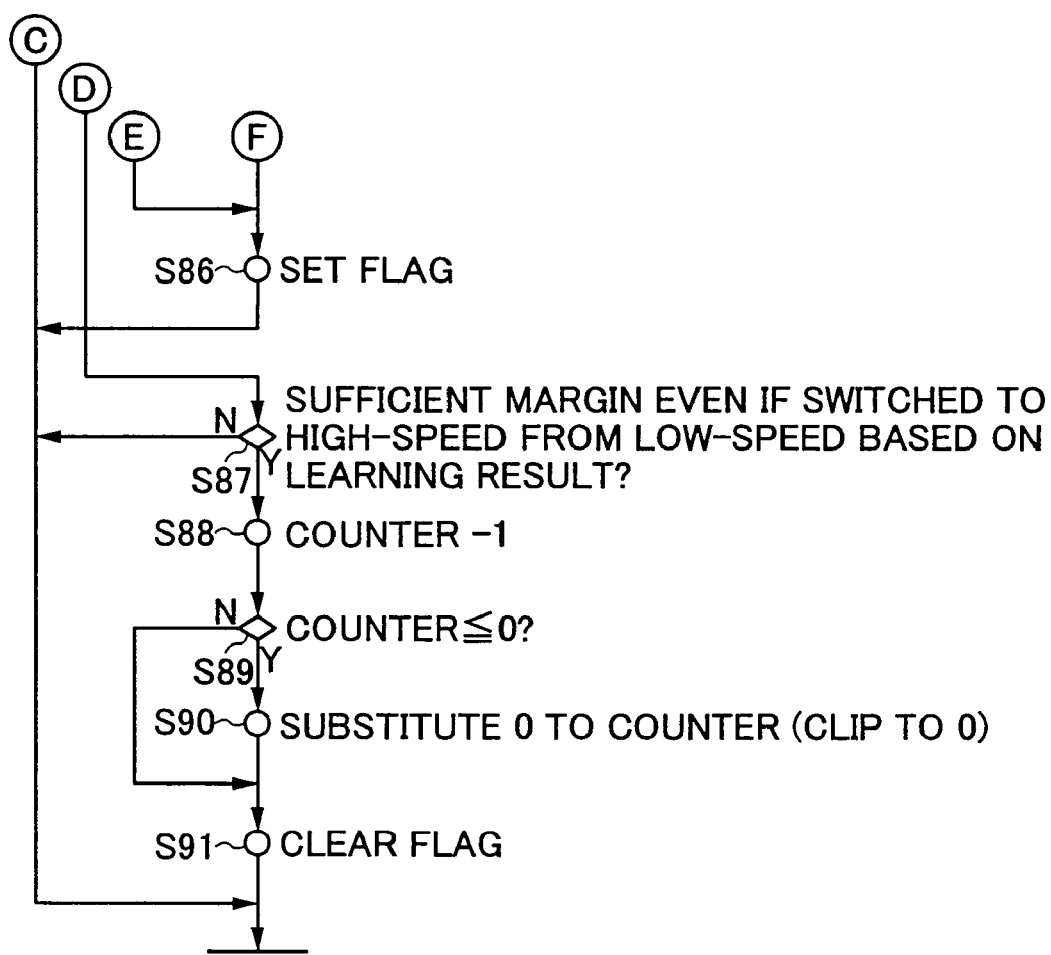
FIG. 15 is a flow chart for explaining the flag operating process in more detail.

FIGS. 13 through 15 are flow charts for explaining in more detail the flag operating process shown in FIG. 12.

In FIG. 13, a step S61 decides whether or not the low-speed rotation request flag is set. If the decision result in the step S61 is YES, a step S62 decreases the rotational speed of the spindle motor 40 to the low-speed rotation state if the spindle motor 40 is in the high-speed rotation state. On the other hand, if the decision result in the step S61 is NO, a step S63 increases the rotational speed of the spindle motor 40 to the high-speed rotation state if the spindle motor 40 is in the low-speed rotation state. After the step S62 or S63, a step S64 decides whether or not the test write process is necessary with respect to the target track. The process advances to a step S79 which will be described later in conjunction with FIG. 14 if the decision result in the step S64 is NO. If the decision result in the step S64 is YES, a step S65 carries out the test write process, and a step S66 decides whether or not the test write process was successful. If the decision result in the step S66 is YES, the process advances to a step S73 which will be described later in conjunction with FIG. 14.

If the decision result in the step S66 is NO, a step S67 decides whether or not the read or write performance is likely to improve when the state is switched to the low-speed rotation state from the high-speed rotation state. If the decision result in the step S67 is YES, a step S68 adds +10 to a value of an accumulating counter within the MPU 12, for example. A step S69 decides whether or not the value of the accumulating counter is 30 or greater, and if the decision result in the step S69 is YES, a step S70 substitutes 30 to the value of the accumulating counter so as to clip the value to 30. If the decision result in the step S69 is NO or after the step S70, a step S71 sets the low-speed rotation request flag, and the process returns to the step S61. In addition, if the decision result in the step S67 is NO, a step S72 substitutes 0 to the value of the accumulating counter, and the process returns to the step S61.

In FIG. 14, the step S73 decides whether or not a desired read or write margin is obtainable even when the state is switched from the low-speed rotation state to the high-speed rotation state. If the decision result in the step S73 is YES, a step S74 adds −10 to the value of the accumulating counter, that is, subtracts +10 from the value of the accumulating counter. A step S75 decides whether or not the value of the accumulating counter is 0 or less. If the decision result in the step S75 is YES, a step S76 substitutes 0 to the value of the accumulating counter to clip the value to 0. If the decision result in the step S75 is NO or after the step S76, a step S77 clears the low-speed rotation request flag, and the process advances to the step S79 which will be described later. If the decision result in the step S73 is NO, a step S78 substitutes 30 to the value of the accumulating counter, and the process advances to the step S79.

The step S79 carries out the erase-write-verify process with respect to the target track, and a step S80 decides whether or not the learning process is necessary. If the decision result in the step S80 is NO, the process ends as will be described later in conjunction with FIG. 15. On the other hand, if the decision result in the step S80 is YES, a step S81 carries out the learning process. A step S82 decides whether or not the read or write performance is likely to improve when the state is switched to the low-speed rotation state from the high-speed rotation state based on the result of the learning process. If the decision result in the step S82 is NO, the process advances to a step S87 which will be described later in conjunction with FIG. 15. If the decision result in the step S82 is YES, a step S83 adds +1 to the value of the accumulating counter. In addition, a step S84 decides whether or not the value of the accumulating counter is 30 or greater. If the decision result in the step S84 is NO, the process advances to a step S86 which will be described later in conjunction with FIG. 15. If the decision result in the step S84 is YES, a step S85 substitutes 30 to the value of the accumulating counter to clip the value to 30. After the step S85, the process advances to the step S86 shown in FIG. 15.

In FIG. 15, the step S86 sets the low-speed rotation request flag, and the process ends. The step S87 decides, based on the result of the learning process, whether or not the desired read or write margin is obtainable even when the state is switched from the low-speed rotation state to the high-speed rotation state. The process ends if the decision result in the step S87 is NO. On the other hand, if the decision result in the step S87 is YES, a step S88 adds −1 to the value of the accumulating counter, that is, subtracts +1 from the value. A step S89 decides whether or not the value of the accumulating counter is 0 or less. If the decision result in the step S89 is YES, a step S90 substitutes 0 to the value of the accumulating counter to clip the value to 0. If the decision result in the step S89 is NO or after the step S90, a step S91 clears the low-speed rotation request flag, and the process ends.

The accumulating counter used in the above described process counts up or down when it is judged that the switching of the rotational speed is necessary. The value of the accumulating counter is used in common between the result of the test write process and the result of the learning process. The value of the accumulating counter is added with a value +10 if it is judged better to switch the state to the low-speed rotation state based on the result of the test write process, and is added with a value +1 if judged similarly based on the result of the learning process. On the other hand, the value of the accumulating counter is added with a value −10 if it is judged better to switch the state to the high-speed rotation state based on the result of the test write process, and is added with a value −1 if judged similarly based on the result of the learning process. The low-speed rotation request flag is set when the value of the accumulating counter is +30 or greater, and the low-speed rotation request flag is cleared when the value of the accumulating counter is 0 or less. Normally, a time on the order of seconds is required to switch the rotational speed of the spindle motor 40, and the performance of the optical disk unit deteriorates if the rotational speed is switched frequently. Accordingly, for the test write process, the rotational speed is switched when it is judged three consecutive times that it is necessary to switch the rotational speed. For the learning process, the rotational speed is switched when it is judged thirty times that it is necessary to switch the rotational speed, by reducing the weighting of the value of the accumulating counter.

Figure 16:
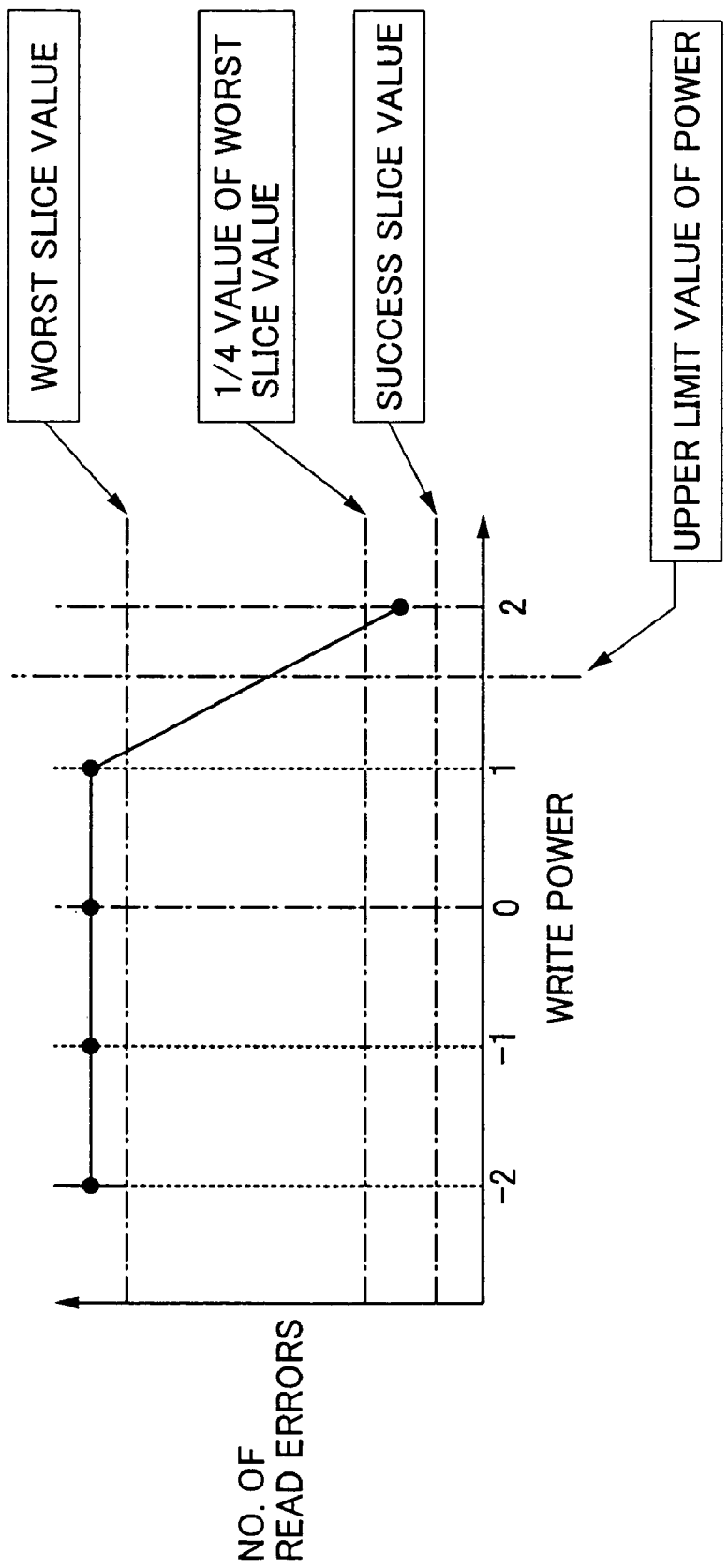
FIG. 16 is a diagram for explaining a case where it is judged better to set the rotational speed to a low speed.

FIG. 16 is a diagram for explaining a case where it is judged better to switch the state to the low-speed rotation state as a result of carrying out the test write process in the high-speed rotation state.

In the case shown in FIG. 16, the test write process carries out an erase-write using five kinds of power, carries out a read without error correction, and compares the read data and the write data so as to calculate the number of errors. The power which makes the number of errors (or error rate) a minimum is determined as an optimum power, and this optimum power is used when carrying out the actual write.

Normally, of the five kinds of power, the number of errors read falls under a success slice value at one or more points, and a center value of such points is determined as the optimum power.

When the write power becomes insufficient in the high-speed rotation state, a point where the number of errors improves will no longer be generated unless the power is increased. On the other hand, in order to prevent damage or destruction of the laser diode 30-1, an upper limit value of the power is set so that the generated power will not exceed the upper limit value. Accordingly, even if the test write process instructs a high power, the actual power is clipped to the upper limit value.

FIG. 16 shows a case where the optimum power shifts towards the high power side and exceeds the upper limit value due to insufficient power during the high-speed rotation. In other words, the number of errors becomes smaller than ¼ the value at a worst slice value at the fifth and last point where the write power is increased, and it is possible to see the tendency of the number of errors to decrease. In this state, the power exceeds the upper limit value described above. When the number of errors has such a distribution, it is judged that the probability of a successful test write process being carried out is high if the state is switched to the low-speed rotation state.

The measurement itself of the write power may be made by a known method, such as a method proposed in a Japanese Laid-Open Patent Application No. 9-293259, for example.

Figure 17:
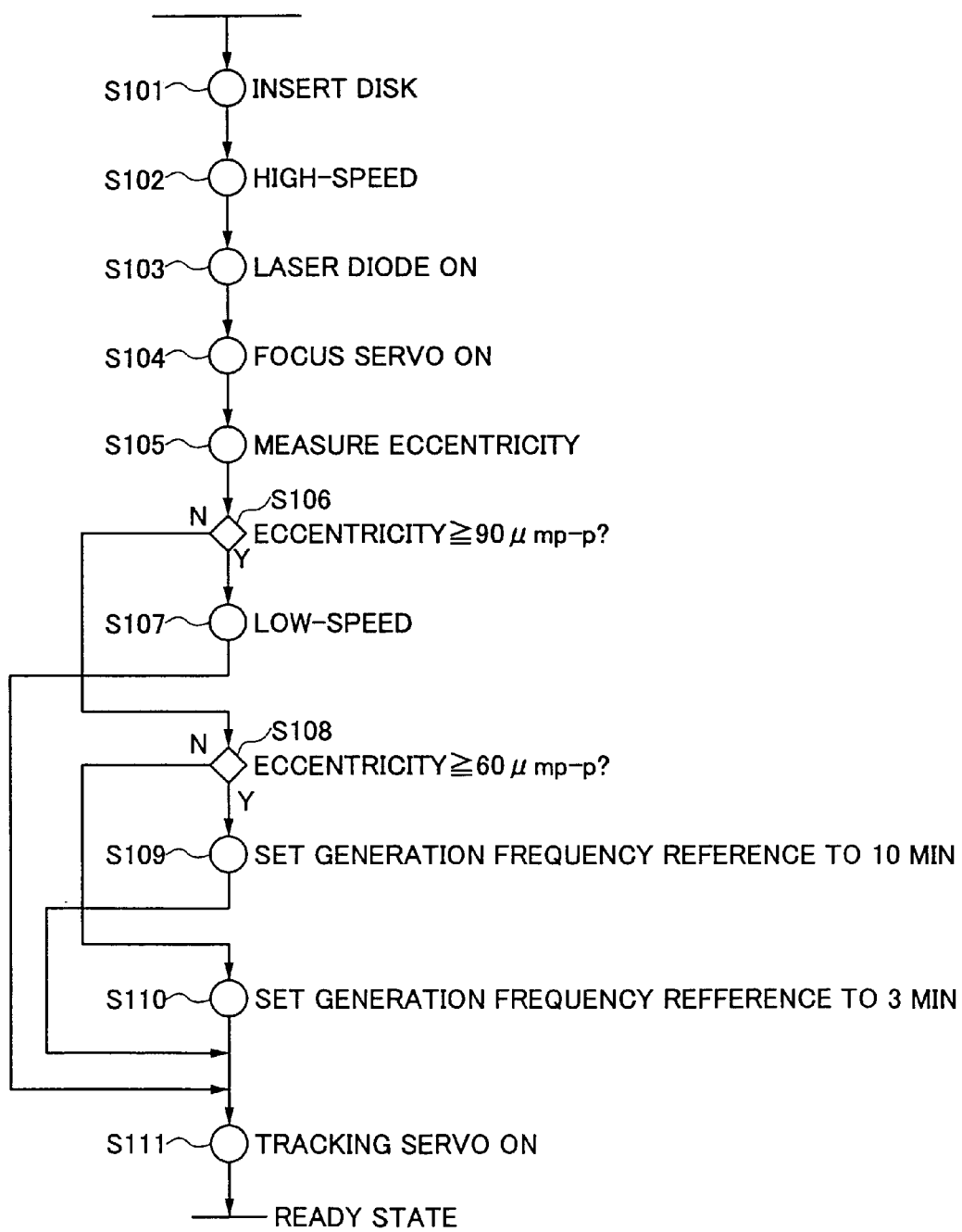
FIG. 17 is a flow chart for explaining a case where the rotational speed makes a transition to the low speed.
Figure 18:
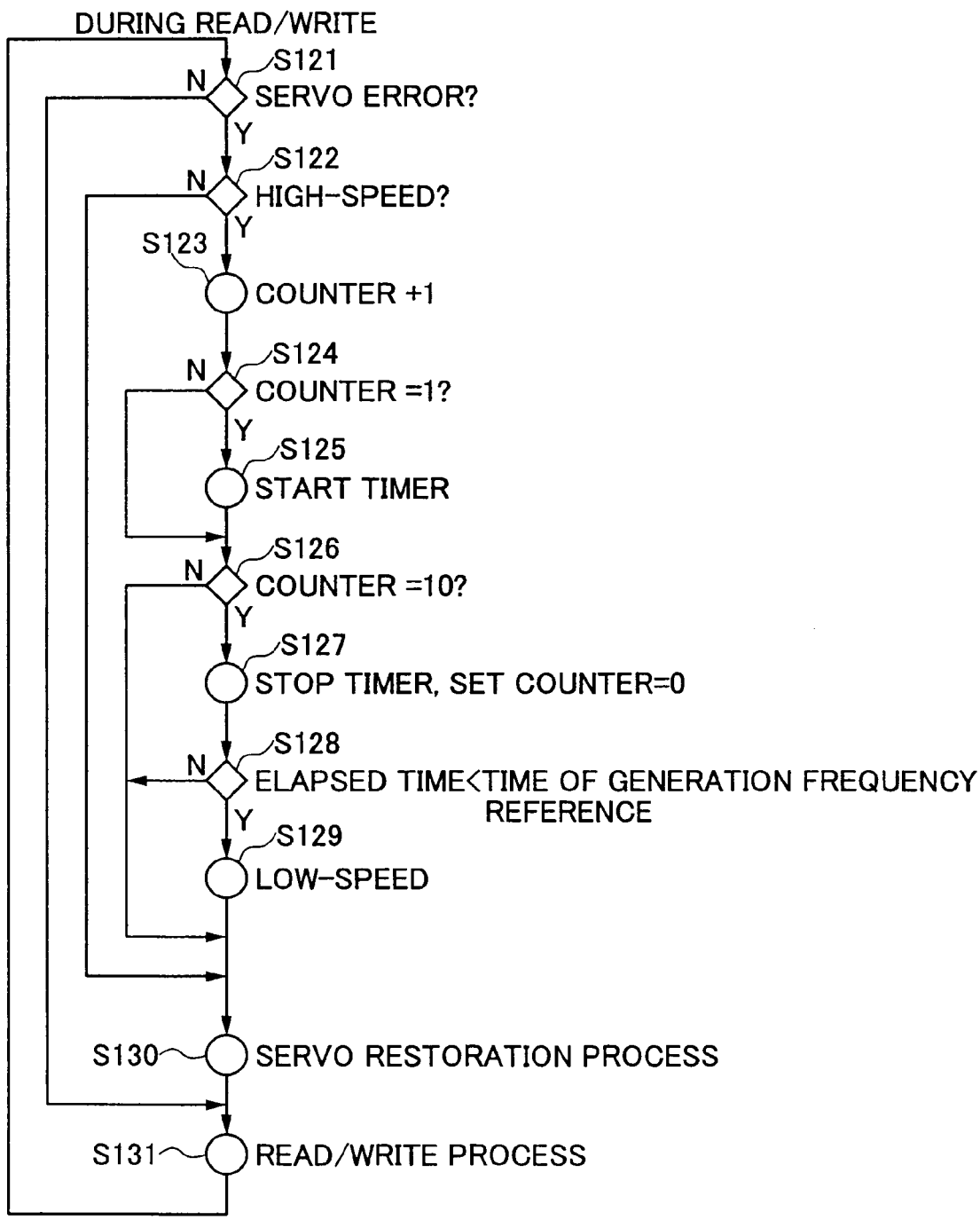
FIG. 18 is a flow chart for explaining the case where the rotational speed makes the transition to the low speed.

FIGS. 17 and 18 are flow charts for explaining a case where it is judged better to switch the state to the low-speed rotation state. FIGS. 17 and 18 show a case where state is switched to the low-speed rotation sate depending on the amount of eccentricity of the optical disk 72 and the frequency of generation of the servo error during the read or write when loading the optical disk 72 into the optical disk unit.

When the amount of eccentricity of the loaded optical disk 72 is extremely large, the state is switched to the low-speed rotation state. When the amount of eccentricity of the loaded optical disk 72 is small or medium, the operation is continued in the high-speed rotation state, and the state is switched to the low-speed rotation state when the frequency of generation of the servo error (abnormality) is large. When the frequency of generation of the servo abnormality exceeds a certain reference, the state is switched to the low-speed rotation state, but this reference is switched between a case where the amount of eccentricity is small and a case where the amount of eccentricity is medium. That is, when the amount of eccentricity is small, the reference used to judge the frequency of generation of the servo abnormality is made more severe as compared to when the amount of eccentricity is medium.

For example, when the amount of eccentricity of the loaded optical disk 72 is 90 μmp-p or larger, the state is switched to the low-speed rotation state. When the amount of eccentricity is 60 to 90 μmp-p, the state is switched to the low-speed rotation state if the servo abnormality occurs ten times within a time of ten minutes. When the amount of eccentricity is less than 60 μmp-p, the state is switched to the low-speed rotation state if the servo abnormality is generated ten times within a time of three minutes.

In FIG. 17, when the optical disk 72 is loaded into the optical disk unit in a step S101, a step S102 rotates the spindle motor 40 at the high speed. A step S103 turns ON the laser diode 30-1 so as to emit light therefrom, and a step S104 turns the focus servo ON. A step S105 measures the amount of eccentricity of the loaded optical disk 72, and a step S106 decides whether or not the amount of eccentricity is 90 μmp-p or larger. For example, the measurement itself of the amount of eccentricity may be made by a known method, such as a method proposed in a Japanese Laid-Open Patent Application No. 5-109101. If the decision result in the step S106 is YES, a step S107 switches the state to the low-speed rotation state, and the process advances to a step S111 which will be described later.

On the other hand, if the decision result in the step S106 is NO, a step S108 decides whether or not the amount of eccentricity is 60 μmp-p or larger. If the decision result in the step S108 is YES, a step S109 sets a generation frequency reference of the servo abnormality to ten minutes, and the process advances to the step S111. If the decision result in the step S108 is NO, a step S110 sets the generation frequency reference of the servo abnormality of three minutes, and the process advances to the step S111. The step S111 turns the tracking servo ON, and the optical disk unit thereby assumes a ready state.

In FIG. 18, a step S121 decides whether or not the servo error (abnormality) is generated during the read or write. The process advances to a step S131 which will be described later if the decision result in the step S121 is NO. If the decision result in the step S121 is YES, a step S122 decides whether or not the present state is the high-speed rotation state. The process advances to a step S130 which will be described later if the decision result in the step S122 is NO. If the decision result in the step S122 is YES, a step S123 increments by +1 a value of an internal counter of the MPU 12, for example, and a step S124 decides whether or not the value of the internal counter is 1. If the decision result in the step S124 is YES, a step S125 starts an internal timer of the MPU 12, for example.

If the decision result in the step S124 is NO or after the step S125, a step S126 decides whether or not the value of the internal counter reached 10. The process advances to the step S130 which will be described later if the decision result in the step S126 is NO. On the other hand, if the decision result in the step S126 is YES, a step S127 stops the internal timer, and sets 0 to the internal counter. In addition, a step S128 decides whether or not the elapsed time measured by the internal timer is shorter than a time of the generation frequency reference of the servo abnormality. If the decision result in the step S128 is YES, a step S129 switches the state to the low-speed rotation state. If the decision result in the step S128 is NO or after the step S129, the process advances to the step S130.

The step S130 carries out a servo restoration process, including the tracking servo and/or the focus servo. In addition, the step S131 carries out the read or write process, and the process returns to the step S121.

Next, a description will be given of a second embodiment of the storage apparatus according to the present invention, by referring to FIGS. 19 and 20. The construction of this second embodiment of the storage apparatus is the same as that of the first embodiment of the storage apparatus shown in FIGS. 1 and 2, and an illustration thereof will be omitted. In this second embodiment of the storage apparatus, the present invention is applied to the optical disk unit. In addition, this second embodiment of the storage apparatus employs a second embodiment of the rotation control method according to the present invention.

Figure 19:
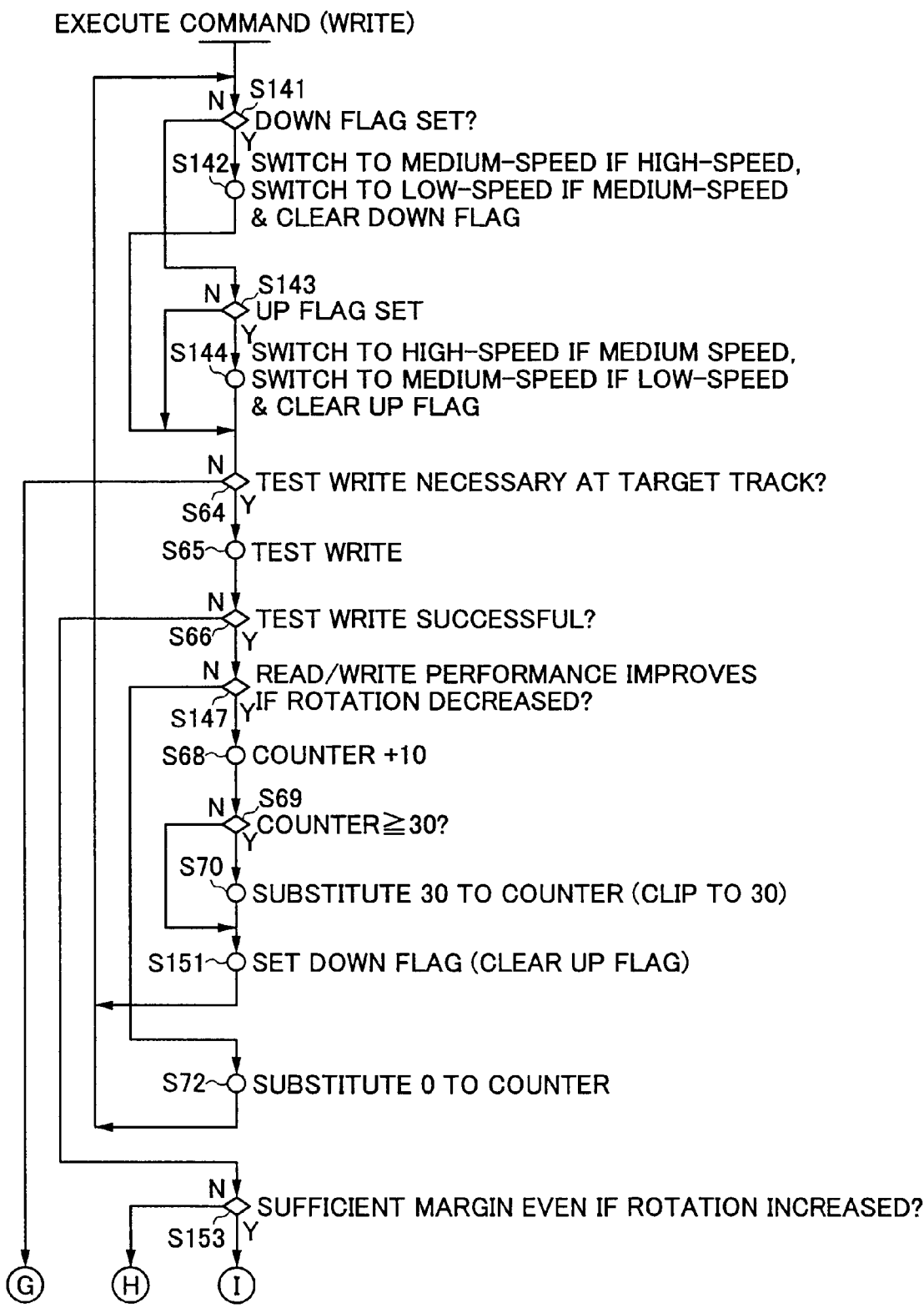
FIG. 19 is a flow chart for explaining a flag operating process of a second embodiment of the storage apparatus according to the present invention.
Figure 20:
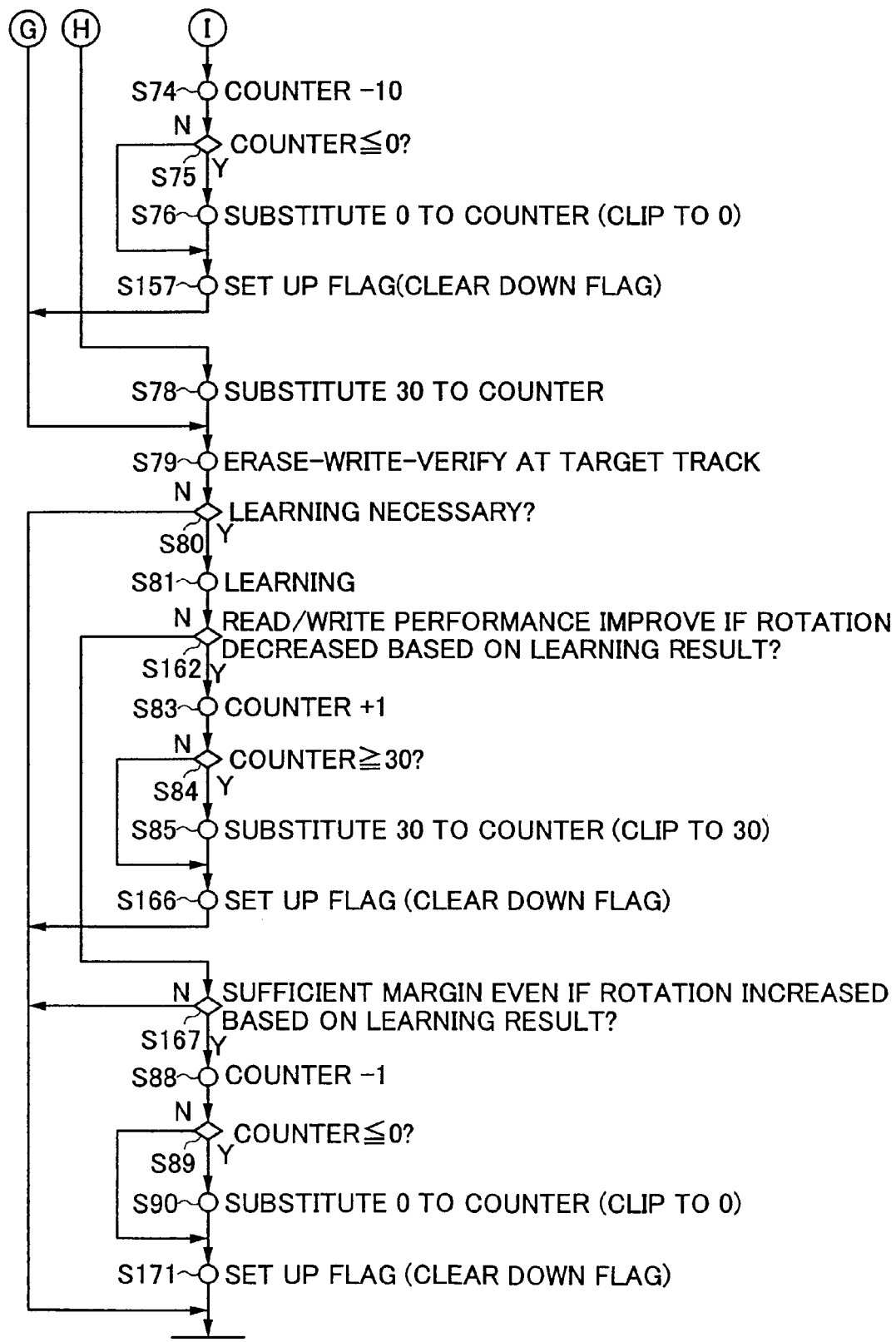
FIG. 20 is a flow chart for explaining the flag operating process of the second embodiment.

FIGS. 19 and 20 are flow charts for explaining a flag operating process of this second embodiment, and correspond to the second embodiment of the rotation control method. The process shown in FIGS. 19 and 20 is carried out by the MPU 12. In FIGS. 19 and 20, those steps which are the same as those corresponding steps in FIGS. 13 through 15 are designated by the same reference numerals, and a description thereof will be omitted. In this second embodiment, the rotational speed is switched in two or more stages, and a description will be given of a case where the rotational speed is switched in three stages. For example, the high-speed rotation state and a medium-speed rotation state may be rotational speeds of the high-speed mode, and the low-speed rotation state may be a rotational speed of the normal mode.

In FIG. 19, a step S141 decides whether or not a rotational speed down request flag is set. If the decision result in the step S141 is YES, a step S142 carries out a process (i) if the present state is the high-speed rotation state, and carries out a process (ii) if the present state is the medium-speed rotation state. The process (i) decreases the rotational speed of the spindle motor 40 to switch to the medium-speed rotation, and clears the rotational speed down request flag. The process (ii) decreases the rotational speed of the spindle motor 40 to switch to the low-speed rotation, and clears the rotational speed down request flag. After the step S142, the process advances to the step S64. On the other hand, if the decision result in the step S141 is NO, a step S143 decides whether or not a rotational speed up request flag is set. The process advances to the step S64 if the decision result in the step S143 is NO. If the decision result in the step S143 is YES, a step S144 carries out a process (iii) if the present state is the medium-speed rotation state, and carries out a process (iv) if the present state is the low-speed rotation state. The process (iii) increases the rotational speed of the spindle motor 40 to switch to the high-speed rotation, and clears the rotational speed up request flag. The process (iv) increases the rotational speed of the spindle motor 40 to switch to the medium-speed rotation, and clears the rotational speed up request flag.

If the decision result in the step S66 is NO, a step S147 decides whether or not the read or write performance is likely to improve if the rotational speed is decreased. The process advances to the step S72 if the decision result in the step S147 is NO. The process advances to the step S68 if the decision result in the step S147 is YES.

If the decision result in the step S69 is NO or after the step S70, a step S151 sets the rotational speed down request flag or clears the rotational speed up request flag, and the process returns to the step S141.

If the decision result in the step S66 is YES, a step S153 decides whether or not a sufficient read or write margin is obtainable even if the rotational speed is increased. If the decision result in the step S153 is NO, the process advances to the step S78 shown in FIG. 20 which will be described later. On the other hand, if the decision result in the step S153 is YES, the process advances to the step S74 shown in FIG. 20 which will be described later.

In FIG. 20, if the decision result in the step S75 is NO or after the step S76, a step S157 sets the rotational speed up request flag or clears the rotational speed down request flag, and the process advances to the step S79.

After the step S81, a step S162 decides whether or not the read or write performance is likely to improve if the rotational speed is decreased, based on the result of the learning process. The process advances to a step S167 if the decision result in the step S162 is NO, and the process advances to the step S83 if the decision result in the step S162 is YES.

If the decision result in the step S84 is No or after the step S85, a step S166 sets the rotational speed down request flag or clears the rotational speed up request flag, and the process ends.

The step S167 decides whether or not a sufficient read or write margin is obtainable even if the rotational speed is increased, based on the result of the learning process. The process ends if the decision result in the step S167 is NO, and the process advances to the step S88 if the decision result in the step S167 is YES.

If the decision result in the step S89 is NO or after the step S90, a step S171 sets the rotational speed up request flag or clears the rotational speed down request flag, and the process ends.

When changing the rotational speed of the optical disk depending on the read or write margin, it is of course possible to detect the read or write margin directly from the error rate or the like or, to estimate the read or write margin by detecting parameters such as the power of the light irradiated on the optical disk. Hence, the rotational speed of the optical disk can be changed depending on the read or write margin obtained by any such methods.

In the embodiments described above, the present invention is applied to an optical disk unit which uses a magneto-optical disk. However, the present invention is of course similarly applicable to apparatuses which use disk-shaped recording media such as phase-change type optical disks and magnetic disks. In addition, the shape of the recording medium is not limited to the disk-shape, and the recording medium may have a card-shape or the like with a spiral track or concentric tracks formed similarly to the optical disk of the above described embodiments.

Further, the present invention is not limited to these embodiments, but various variations and modifications may be made without departing from the scope of the present invention.

What is claimed is:

1. A rotation control method in a storage apparatus having a processor for rotating an optical recording medium at two or more kinds of rotational speeds, comprising the steps of:
   (a) decreasing the rotational speed when a power of a light irradiated on the optical recording medium exceeds a reference value; and
   (b) increasing the rotational speed when the power of the light has a margin greater than a predetermined value with respect to the reference value;
   wherein the processor determines whether to perform the steps of decreasing and increasing the rotational speed.

2. A storage apparatus comprising:
   a spindle motor configured to rotate an optical recording medium at two or more kinds of rotational speeds; and
   a processor configured to decrease the rotational speed when a power of a light irradiated on the optical recording medium exceeds a reference value, and to increase the rotational speed when the power of the light has a margin greater than a predetermined value with respect to the reference value;
   wherein the processor determines whether the rotational speed should be decreased or increased.

3. The rotation control method as claimed in claim 1, wherein said steps (a) and (b) are executed when carrying out at least one of read and write operations with respect to the optical recording medium.

4. The storage apparatus as claimed in claim 2, wherein said controller controls the rotational speed to increase or decrease when carrying out at least one of read and write operations with respect to the optical recording medium.

* * * * *

UNITED STATES PATENT AND TRADEMARK OFFICE
CERTIFICATE OF CORRECTION

| | | |
|---|---|---|
| PATENT NO. | : 7,345,972 B2 | Page 1 of 1 |
| APPLICATION NO. | : 11/175096 | |
| DATED | : March 18, 2008 | |
| INVENTOR(S) | : Masaki | |

It is certified that error appears in the above-identified patent and that said Letters Patent is hereby corrected as shown below:

On the Patent Face:

Insert --(62) Related U.S. Application Data: Divisional of 09/808,540 filed on March 14, 2001.

In the Specification:

Col. 1, insert the following paragraph after the title: --This is a divisional of Serial No. 09/808,540 filed on March 14, 2001--.

Signed and Sealed this

Fifth Day of August, 2008

JON W. DUDAS
*Director of the United States Patent and Trademark Office*